US012212055B2

(12) United States Patent
Hu et al.

(10) Patent No.: US 12,212,055 B2
(45) Date of Patent: Jan. 28, 2025

(54) ANTENNA DECOUPLING STRUCTURE, MIMO ANTENNA, AND TERMINAL

(71) Applicant: HONOR DEVICE CO., LTD., SHENZHEN (CN)

(72) Inventors: Yiwu Hu, Shenzhen (CN); Kunpeng Wei, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 53 days.

(21) Appl. No.: 18/013,338

(22) PCT Filed: Apr. 25, 2022

(86) PCT No.: PCT/CN2022/089005
§ 371 (c)(1),
(2) Date: Dec. 28, 2022

(87) PCT Pub. No.: WO2022/233248
PCT Pub. Date: Nov. 10, 2022

(65) Prior Publication Data

US 2023/0261370 A1 Aug. 17, 2023

(30) Foreign Application Priority Data

May 6, 2021 (CN) ........................ 202110490769.6

(51) Int. Cl.
*H01Q 1/52* (2006.01)
*H01Q 1/22* (2006.01)
(Continued)

(52) U.S. Cl.
CPC ........... *H01Q 1/521* (2013.01); *H01Q 1/2291* (2013.01); *H01Q 1/48* (2013.01); *H01Q 9/0421* (2013.01); *H01Q 9/0457* (2013.01); *H01Q 21/00* (2013.01)

(58) Field of Classification Search
CPC .......... H01Q 1/2291; H01Q 1/48; H01Q 1/52; H01Q 1/521; H01Q 1/523; H01Q 1/525; H01Q 9/0421; H01Q 9/0457; H01Q 5/40
See application file for complete search history.

(56) References Cited

U.S. PATENT DOCUMENTS

| | | | |
|---|---|---|---|
| 8,860,623 | B2 | 10/2014 | Lo et al. |
| 9,337,537 | B2 | 5/2016 | Hu et al. |

(Continued)

FOREIGN PATENT DOCUMENTS

| | | | |
|---|---|---|---|
| CN | 104143691 | A | 11/2014 |
| CN | 204375977 | U | 6/2015 |

(Continued)

*Primary Examiner* — Jason M Crawford
(74) *Attorney, Agent, or Firm* — WOMBLE BOND DICKINSON (US) LLP

(57) ABSTRACT

This application provides an antenna decoupling structure, a MIMO antenna, and a terminal. The antenna decoupling structure includes a grounding stub and a capacitor structure, where a first end of the grounding stub is connected to an antenna floor, to form an equivalent inductor; and a first end of the capacitor structure is connected to the antenna floor, and a second end of the capacitor structure is connected to a second end of the grounding stub, so that the equivalent inductor and the capacitor structure form an LC resonant structure, where a parameter corresponding to the LC resonant structure meets a decoupling requirement for at least one target decoupling frequency band. Because the resonant frequency depends on the inductance and the capacitance that correspond to the LC resonant structure, antenna miniaturization can be realized by reducing a size of each portion of the decoupling structure.

19 Claims, 24 Drawing Sheets

(51) Int. Cl.
*H01Q 1/48* (2006.01)
*H01Q 9/04* (2006.01)
*H01Q 21/00* (2006.01)

(56) References Cited

U.S. PATENT DOCUMENTS

| | | | | |
|---|---|---|---|---|
| 9,496,614 | B2 | 11/2016 | Bringuier et al. | |
| 9,543,644 | B2 * | 1/2017 | Wu | H01Q 1/523 |
| 9,601,825 | B1 * | 3/2017 | Lo | H01Q 1/243 |
| 9,774,079 | B2 * | 9/2017 | Liu | H01Q 1/243 |
| 10,103,449 | B2 | 10/2018 | Wong et al. | |
| 10,164,330 | B2 * | 12/2018 | Wu | H01Q 1/52 |
| 2012/0274536 | A1 * | 11/2012 | Pan | H01Q 21/28 343/853 |
| 2013/0069842 | A1 * | 3/2013 | Lee | H01Q 5/371 343/853 |
| 2013/0257674 | A1 * | 10/2013 | Li | H01Q 9/42 343/853 |
| 2014/0043202 | A1 | 2/2014 | Wong et al. | |
| 2014/0139391 | A1 * | 5/2014 | Lo | H01Q 21/28 343/841 |
| 2014/0139392 | A1 * | 5/2014 | Wong | H01Q 1/521 343/841 |
| 2014/0152523 | A1 * | 6/2014 | Wu | H01Q 1/523 343/841 |
| 2016/0006119 | A1 * | 1/2016 | Wu | H01Q 1/523 343/853 |
| 2017/0062932 | A1 * | 3/2017 | Foster | H01Q 1/38 |
| 2018/0019515 | A1 * | 1/2018 | Zhang | H01Q 1/521 |
| 2019/0252770 | A1 * | 8/2019 | Thakur | H01Q 5/335 |
| 2020/0044329 | A1 * | 2/2020 | Wu | H01Q 1/36 |
| 2023/0261370 | A1 * | 8/2023 | Hu | H01Q 9/0457 343/848 |

FOREIGN PATENT DOCUMENTS

| | | | |
|---|---|---|---|
| CN | 106463842 | A | 2/2017 |
| CN | 106856261 | A | 6/2017 |
| CN | 110098484 | A | 8/2019 |
| CN | 110137681 | A | 8/2019 |
| CN | 111416210 | A | 7/2020 |
| CN | 112186337 | A | 1/2021 |
| CN | 113381184 | A | 9/2021 |
| WO | 2020168916 | A1 | 8/2020 |

* cited by examiner

ANTENNA DECOUPLING STRUCTURE, MIMO ANTENNA, AND TERMINAL

CROSS-REFERECNE TO RELATED APPLICATIONS

This application is a national stage of International Application No. PCT/CN2022/089005, filed on Apr. 25, 2022, which claims priority to Chinese Patent Application No. 202110490769.6, filed on May 6, 2021. The disclosures of both of the aforementioned application are hereby incorporated by reference in their entireties.

TECHNICAL FIELD

This application relates to the field of communications technologies, and in particular, to an antenna decoupling structure, a MIMO antenna, and a terminal.

BACKGROUND

With the development of mobile communications technologies, a terminal notebook computer is required to support more and more frequency bands, and a MIMO (Multiple-Input Multiple-Output) antenna is more and more widely applied to terminal notebook computers. Referring to FIG. 1*a* that shows an antenna structure designed for a conventional notebook computer, the antenna structure includes two IFA antenna units that are adjacent to each other at an interval. A left IFA antenna unit has a first feed point 01. A right IFA antenna unit has a second feed point 02. When the first feed point 01 is excited, a current is coupled to the second feed point 02 through an antenna floor 03. As a result, an isolation between the two IFA antenna units is decreased.

To resolve the problem that the isolation between the two IFA antenna units is low, a T-shaped decoupling structure 04 is added between the two IFA antenna units, as shown in FIG. 1*b*. Then, the first feed point 01 is excited. In this way, part of a current flowing from the first feed point 01 is coupled to the T-shaped decoupling structure 04 through the antenna floor 03, thereby reducing an amount of the current flowing to the second feed point 02, and increasing an isolation between the two IFA antenna units. However, the T-shaped decoupling structure 04 in FIG. 1*b* implements decoupling for a target decoupling frequency band mainly by adjusting a length of a decoupling stub. Generally, a smallest length of the decoupling stub is a quarter of a wavelength corresponding to the target decoupling frequency band. For example, operating frequency bands of the IFA antenna units are 2.4 GHz and 5 GHz, respectively. The T-shaped decoupling structure 04 includes two decoupling stubs of different lengths, to implement decoupling for the two frequency bands: 2.4 GHz and 5 GHz. The longer decoupling stub is configured to implement decoupling for the 2.4 GHz frequency band; and the shorter decoupling stub is configured to implement decoupling for the 5 GHz frequency band. As a result, a total length d2 of decoupling stubs of the T-shaped decoupling structure 04 for decoupling a 2.4 GHz and 5 GHz dual-band antenna needs to reach at least 30 mm, and a total length d of the antenna needs to reach at least 115 mm.

However, as shown in FIG. 1*c*, space reserved for an antenna becomes increasingly smaller due to a development trend towards greatly increasing a screen-to-body ratio of a terminal notebook computer product. It is hard for the foregoing large-size antenna to meet a requirement for a small-size antenna in a future terminal product having a greater screen-to-body ratio. Especially, during design of a MIMO multi-band antenna, when two antennas operate at a same frequency and are disposed adjacent to each other, an isolation between the two antennas is greatly decreased. Therefore, how to miniaturize an antenna while increasing an isolation between two antennas becomes a technical challenge to be met by an antenna designer.

SUMMARY

This application provides an antenna decoupling structure, an antenna, and a terminal, to implement decoupling for a target decoupling frequency band by using a constituted LC resonant structure, implement antenna miniaturization, and increase an isolation between antennas.

According to a first aspect, this application provides an antenna decoupling structure. The antenna decoupling structure includes a grounding stub and a capacitor structure, where a first end of the grounding stub is connected to an antenna floor, to form an equivalent inductor; and a first end of the capacitor structure is connected to the antenna floor, and a second end of the capacitor structure is connected to a second end of the grounding stub, so that the equivalent inductor and the capacitor structure form an LC resonant structure, where a parameter corresponding to the LC resonant structure meets a decoupling requirement for at least one target decoupling frequency band.

In this way, a capacitance of the capacitor structure and an inductance of the equivalent inductor L are adjusted to ensure that a resonant frequency of the LC resonant structure is the same as the target decoupling frequency band, thereby implementing decoupling for the target decoupling frequency band. Because the resonant frequency depends on the inductance and the capacitance that correspond to the LC resonant structure, antenna miniaturization can be realized by reducing a size of each portion of the decoupling structure. Different resonant modes can be formed by adjusting the parameter corresponding to the LC resonant structure, thereby meeting decoupling requirements for different target decoupling frequency bands.

In an implementation, the antenna decoupling structure provided in this application further includes a first decoupling stub and a second decoupling stub, where the first decoupling stub and the second decoupling stub are respectively disposed on two sides of the grounding stub; a first end of the first decoupling stub is connected to the second end of the grounding stub, and a length of the first decoupling stub meets a decoupling requirement for a second target decoupling frequency band; and a first end of the second decoupling stub is connected to the second end of the grounding stub, and a length of the second decoupling stub meets a decoupling requirement for a third target decoupling frequency band, where the parameter corresponding to the LC resonant structure meets a decoupling requirement for a first target decoupling frequency band, and the first target decoupling frequency band is a lowest frequency band among the first target decoupling frequency band, the second target decoupling frequency band, and the third target decoupling frequency band.

In this way, decoupling for three frequency bands can be implemented by using the LC resonant structure, the first decoupling stub, and the second decoupling stub, respectively, thereby implementing decoupling for a plurality of operating frequency bands.

In an implementation, the length of the first decoupling stub is a quarter of a wavelength corresponding to a center frequency of the second target decoupling frequency band; the length of the second decoupling stub is a quarter of a wavelength corresponding to a center frequency of the third target decoupling frequency band; and an open end formed after bending of the first decoupling stub is disposed opposite to an open end formed after bending of the second decoupling stub.

In this way, the lengths of the first decoupling stub and the second decoupling stub meet the decoupling requirements for the target decoupling frequency bands; and miniaturization is guaranteed. As the open end formed after bending of the first decoupling stub is disposed opposite to the open end formed after bending of the second decoupling stub, space occupied by the first decoupling stub and the second decoupling stub can be further reduced.

In an implementation, the capacitor structure uses a lumped parameter capacitor.

In this way, convenience is brought for implementing miniaturization of the decoupling structure because a size of the lumped parameter capacitor is small.

In an implementation, the capacitor structure is formed by coupling a capacitive coupling stub to the grounding stub that is disposed opposite to a first end of the capacitive coupling stub at an interval, and a second end of the capacitive coupling stub is connected to the antenna floor.

In this way, structures of the capacitive coupling stub and the grounding stub are coupled to form a required capacitor structure, so that a small quantity of components can be added outside the coupled structure.

In an implementation, a plurality of coupling slots are formed between the first end of the capacitive coupling stub and the first end of the grounding stub.

In this way, the plurality of coupling slots are formed between the first end of the capacitive coupling stub and the first end of the grounding stub, which increases a coupling area, and a capacitance of the capacitor structure.

In an implementation, the grounding stub includes a first grounding sub-stub and a second grounding sub-stub that are disposed in an L-shaped form, a first end of the first grounding sub-stub is perpendicularly connected to the antenna floor, a second end of the first grounding sub-stub is perpendicularly connected to a first end of the second grounding sub-stub, and a first groove is formed in a side, facing the antenna floor, of the second grounding sub-stub; and the capacitive coupling stub includes a first capacitive coupling sub-stub and a second capacitive coupling sub-stub that are disposed in a T-shaped form, a first end of the first capacitive coupling sub-stub is disposed in the first groove and opposite to the first groove at an interval, a second end of the first capacitive coupling sub-stub is perpendicularly connected to the antenna floor, a first end of the second capacitive coupling sub-stub is perpendicularly connected to the first capacitive coupling sub-stub, and the second capacitive coupling sub-stub is disposed opposite to a second end of the second grounding sub-stub at an interval.

In this way, the first groove is formed in the grounding stub, and a structure of the capacitive coupling stub is designed to T-shaped to match the first groove, so that the plurality of coupling slots are formed between the capacitive coupling stub and the grounding stub, which increases a capacitance of the coupling capacitor.

In an implementation, the grounding stub includes a first grounding sub-stub, a second grounding sub-stub, and a third grounding sub-stub, a first end of the first grounding sub-stub is perpendicularly connected to the antenna floor, a second end of the first grounding sub-stub is perpendicularly connected to a first end of the second grounding sub-stub, a second end of the second grounding sub-stub is perpendicularly connected to a first end of the third grounding sub-stub, and a second end of the third grounding sub-stub faces the antenna floor; and the capacitive coupling stub includes a third capacitive coupling sub-stub and a fourth capacitive coupling sub-stub, a first end of the third capacitive coupling sub-stub is perpendicularly connected to the antenna floor, a second end of the third capacitive coupling sub-stub is perpendicularly connected to the fourth capacitive coupling sub-stub, a second groove is formed in a side, away from the antenna floor, of the fourth capacitive coupling sub-stub, and the second end of the third grounding sub-stub is disposed in the second groove and opposite to the second groove at an interval.

In this way, the second groove is formed in the capacitive coupling stub, and the third grounding sub-stub disposed opposite to the second groove at an interval is designed on the grounding stub in a matching manner, so that the plurality of coupling slots are formed between the capacitive coupling stub and the grounding stub, which increases a capacitance of the coupling capacitor.

In an implementation, the first target decoupling frequency band ranges from 2.49 GHz to 2.69 GHz, the second target decoupling frequency band ranges from 3.3 GHz to 3.8 GHz, and the third target decoupling frequency band ranges from 4.4 GHz to 5 GHz; the grounding stub includes a first grounding sub-stub, a second grounding sub-stub, and a third grounding sub-stub, a first end of the first grounding sub-stub is perpendicularly connected to the antenna floor, a second end of the first grounding sub-stub is perpendicularly connected to a first end of the second grounding sub-stub, a second end of the second grounding sub-stub is perpendicularly connected to a first end of the third grounding sub-stub, and a second end of the third grounding sub-stub faces the antenna floor; the capacitive coupling stub includes a third capacitive coupling sub-stub and a fourth capacitive coupling sub-stub, a first end of the third capacitive coupling sub-stub is perpendicularly connected to the antenna floor, a second end of the third capacitive coupling sub-stub is perpendicularly connected to the fourth capacitive coupling sub-stub, a second groove is formed in a side, away from the antenna floor, of the fourth capacitive coupling sub-stub, and the second end of the third grounding sub-stub is disposed in the second groove and opposite to the second groove at an interval; a shortest horizontal distance between a first side edge of the first grounding sub-stub and the fourth capacitive coupling sub-stub is 7.3 mm, a shortest horizontal distance between a second side edge of the first grounding sub-stub and the fourth capacitive coupling sub-stub is 8.5 mm, a distance between the antenna floor and a first side edge of the second grounding sub-stub is 2.8 mm, and a distance between the antenna floor and a second side edge of the second grounding sub-stub is 3.8 mm; the first end of the first decoupling stub and the second end of the second grounding sub-stub are connected to each other and form a first connection point, and the first decoupling stub extends from the first connection point in a direction away from the antenna floor by 1 mm, in a direction parallel to the antenna floor and away from the third capacitive coupling sub-stub by 11.5 mm, in a direction away from the antenna floor by 3.7 mm, and in a direction parallel to the antenna floor and close to the third capacitive coupling sub-stub by 7 mm, sequentially; and an open end of the second decoupling stub is disposed opposite to an open end of the first decoupling stub, and the second decoupling stub extends from the open end in a direction away from the first decoupling stub by 5 mm, in a direction close to the antenna floor by 2.5 mm, in a direction close to the first decoupling stub by 3.5 mm, and in a direction close to and perpendicular to the antenna floor, sequentially, and is then connected to the first connection point.

In this way, the antenna decoupling structure can be applied to an NR antenna, to implement decoupling for operating frequency bands of the NR antenna.

According to a second aspect, this application provides a MIMO antenna. The MIMO antenna includes a first antenna unit, a second antenna unit, and the antenna decoupling structure according to the first aspect, where the antenna decoupling structure is disposed at a preset location between the first antenna unit and the second antenna unit, and is configured to increase an isolation between the first antenna unit and the second antenna unit.

In this way, different resonant modes can be formed by adjusting the parameter corresponding to the LC resonant structure, thereby implementing decoupling for different operating frequency bands of the first antenna unit and the second antenna unit.

In an implementation, the first antenna unit includes a feed stub, a floor stub, and a first radiation stub, where the floor stub includes a first floor sub-stub and a second floor sub-stub; a first end of the first floor sub-stub is connected to the antenna floor; a second end of the first floor sub-stub is connected to a first end of the second floor sub-stub; a second end of the second floor sub-stub is disposed opposite to the feed stub at an interval, to form a coupling capacitor; the floor stub and the feed stub form a left-handed antenna mode, and a parameter corresponding to the left-handed antenna mode meets a frequency requirement for the first antenna unit at a first operating frequency band; the second end of the second floor sub-stub is connected to the first radiation stub, the first radiation stub and the feed stub form a first monopole antenna mode, and a parameter corresponding to the first monopole antenna mode meets a frequency requirement for the first antenna unit at a second operating frequency band; and the first operating frequency band is less than the second operating frequency band.

In this way, the feed stub, the floor stub, and the first radiation stub constitute the two antenna modes: the left-handed antenna mode and the first monopole antenna mode that can resonate with different frequencies. A resonant frequency of a left-handed antenna depends on an inductance and a capacitance. Compared with a length of an IFA antenna, a monopole antenna, or another antenna that can be as small as a quarter of a wavelength, a length of the left-handed antenna can be as small as one eighth of the wavelength. Therefore, a size of the first antenna unit can be further reduced.

In an implementation, the first antenna unit further includes a second radiation stub, where the second radiation stub and the first radiation stub are respectively disposed on two sides of the floor stub, a first end of the second radiation stub is connected to the first end of the second floor sub-stub, the first radiation stub, the second floor sub-stub, the second radiation stub, and the feed stub form a balanced antenna mode, and a parameter corresponding to the balanced antenna mode meets a frequency requirement for the first antenna unit at a third operating frequency band; the second radiation stub, the second floor sub-stub, and the feed stub form a second monopole antenna mode, and a parameter corresponding to the second monopole antenna mode meets a frequency requirement for the first antenna unit at a fourth operating frequency band; and the first operating frequency band is less than the fourth operating frequency band, the fourth operating frequency band is less than the third operating frequency band, and the third operating frequency band is less than the second operating frequency band.

In this way, the feed stub, the floor stub, the first radiation stub, and the second radiation stub constitute the four antenna modes: the left-handed antenna mode, the first monopole antenna mode, the second monopole antenna mode, and the balanced antenna mode that can resonate with different frequencies, so that the first antenna unit can cover more operating frequency bands.

In an implementation, the floor stub further includes a third floor sub-stub, a first end of the third floor sub-stub is perpendicularly connected to the second end of the second floor sub-stub, a third groove is formed in a side, away from the antenna floor, of the feed stub, and a second end of the third floor sub-stub is disposed in the third groove and opposite to the third groove at an interval; and the second radiation stub includes a horizontal radiation stub and a vertical radiation stub, a first end of the horizontal radiation stub is connected to the first end of the second floor sub-stub, a second end of the horizontal radiation stub is connected to a first end of the vertical radiation stub, and a second end of the vertical radiation stub faces the antenna floor.

In this way, the second radiation stub is bent, so that a horizontal dimension of the antenna unit can be further reduced.

In an implementation, the MIMO antenna is used as a WIFI MIMO tri-band antenna, where operating frequency bands of the WIFI MIMO tri-band antenna are 2.4 GHz to 2.5 GHz, 5.1 GHz to 5.8 GHz, and 5.9 GHz to 7.1 GHz, respectively; a shortest horizontal distance between the first floor sub-stub and the third floor sub-stub is 6 mm, a distance between a first side edge of the second floor sub-stub and the antenna floor is 4.5 mm, a distance between a second side edge of the second floor sub-stub and the antenna floor is 7.5 mm, a distance between a first side edge of the first radiation stub and a second side edge of the first radiation stub is 3 mm, a distance between a second end of the first radiation stub and a first side edge of the first floor sub-stub is 11.2 mm, a distance between the second end of the first radiation stub and the second end of the horizontal radiation stub is 16 mm, a distance between a first side edge of the vertical radiation stub and a first side edge of the horizontal radiation stub is 2 mm, a distance between the first side edge of the vertical radiation stub and a second side edge of the horizontal radiation stub is 3 mm, and a distance between the first side edge of the horizontal radiation stub and the antenna floor is 6 mm; and the third groove is 4.14 mm wide and 2.3 mm high, and an opening of the third groove is 2.14 mm wide.

In this way, the antenna unit can cover the operating frequency bands of the WIFI MIMO tri-band antenna.

In an implementation, the MIMO antenna is used as an NR antenna, where operating frequency bands of the NR antenna are 2.49 GHz to 2.69 GHz, 3.3 GHz to 3.8 GHz, and 4.4 GHz to 5 GHz, respectively; the first floor sub-stub extends from the first end of the first floor sub-stub in a direction away from the antenna floor by 5.5 mm and in a direction parallel to the antenna floor by a first preset distance, sequentially, and is connected to the first end of the second floor sub-stub; a distance between a first side edge and a second side edge of the first radiation stub is 3 mm, a shortest distance between a second end of the first radiation stub and the third groove is 3.9 mm, a distance between a second end of the first radiation stub and the second end of the horizontal radiation stub is 20.2 mm, and a distance between a first side edge and a second side edge of the vertical radiation stub is 4.5 mm; and the third groove is 4.1 mm wide and 2.8 mm high.

In this way, the antenna unit can cover the operating frequency bands of the NR antenna.

In an implementation, a structure of the first antenna unit is the same as that of the second antenna unit.

In this way, both the first antenna unit and the second antenna unit have antenna structures of the left-handed antenna mode and the first monopole antenna mode, or have antenna structures of the left-handed antenna mode, the first monopole antenna mode, the second monopole antenna mode, and the balanced antenna mode, so that both the first antenna unit and the second antenna unit have more operating frequency bands, and a total size of an antenna can be reduced.

According to a third aspect, this application provides a terminal, including the MIMO antenna according to the second aspect.

In this way, a development trend towards a greater screen-to-body ratio of a terminal product can be met.

BRIEF DESCRIPTION OF DRAWINGS

FIG. 5*l* is a schematic diagram of a current mode of an antenna decoupling structure in FIG. 5*c* when a first feed port is excited under an excitation condition of a 5.5 GHz frequency band;

Figure 1A:
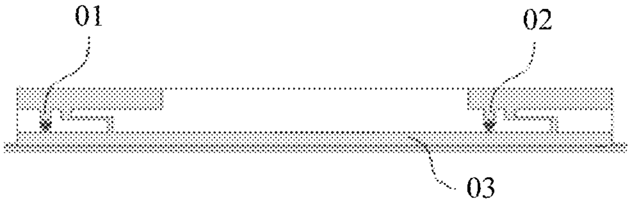
FIG. 1*a* is a schematic structural diagram of a MIMO antenna.

Reference numerals in the accompanying drawings are as follows:

01: first feed point, 02: second feed point, 03: antenna floor, 04: T-shaped decoupling structure;

1: first antenna unit, 2: second antenna unit, 3: antenna decoupling structure, 4: antenna floor, 5: dielectric substrate; 10: first feed point, 11: feed stub, 12: floor stub, 13: first radiation stub, 14: second radiation stub, 20: second feed point, 31A: lumped parameter capacitor, 31B: capacitive coupling stub, 32: grounding stub, 33: first decoupling stub, 34: second decoupling stub; 111: third groove, 121: first floor sub-stub, 122: second floor sub-stub, 123: third floor sub-stub, 141: horizontal radiation stub, 142: vertical radiation stub, 31B1: first capacitive coupling sub-stub, 31B2: second capacitive coupling sub-stub, 31B3: third capacitive coupling sub-stub, 31B4: fourth capacitive coupling sub-stub, 31B5: second groove, 321: first grounding sub-stub, 322: second grounding sub-stub, 323: first groove; 324: third grounding sub-stub.

DESCRIPTION OF EMBODIMENTS

The technical solutions of the embodiments of the present invention are clearly and completely described below with reference to the accompanying drawings in the embodiments of the present invention. Apparently, the described embodiments are merely some rather than all of the embodiments of the present invention. All other embodiments obtained by a person of ordinary skill in the art based on the embodiments of the present invention without creative efforts shall fall within the protection scope of the present invention.

For ease of understanding of the technical solutions of this application, the following briefly describes a concept: an isolation of an antenna.

"Isolation" (isolation) is a ratio of a transmit power of an antenna unit to a received power of another antenna unit, where a unit of the ratio may be dB. An isolation of an antenna is used to quantitatively represent a strength of coupling between antenna units. The unit of the isolation may be dB. A logarithm, to a base of 10, of a ratio of a transmit power to a received power, namely, lg, is used to represent a value of the isolation whose counting unit is dB. A greater value of the isolation indicates a smaller degree of interference between two antenna units. A MIMO antenna, having characteristics such as a high channel capacity and high channel reliability, is more and more widely applied to various wireless communications systems. However, antenna units of an antenna are adjacent to each other because accommodating space of the antenna is limited. As a result, an isolation of the antenna is low. Especially, when two antenna units of the antenna are at a same operating frequency band, a coupling function between the antenna units is serious, and an isolation of the antenna is greatly decreased.

To increase the isolation of the antenna, in an implementation, a T-shaped decoupling structure may be added between the two antenna units.

Figure 1B:
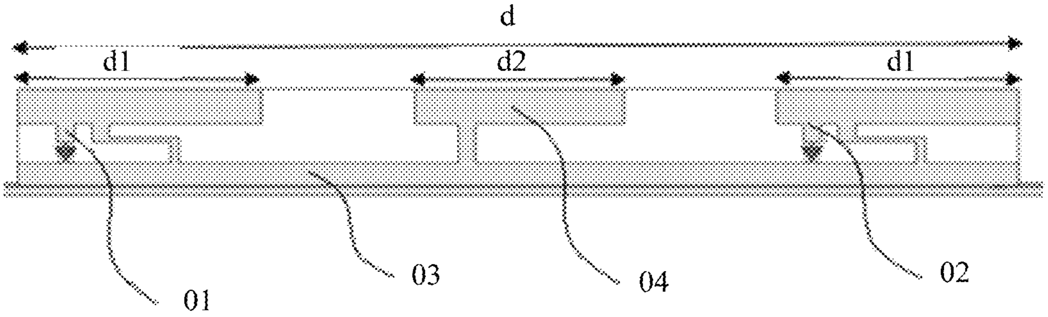
FIG. 1*b* is a schematic structural diagram of another MIMO antenna.
Figure 1C:
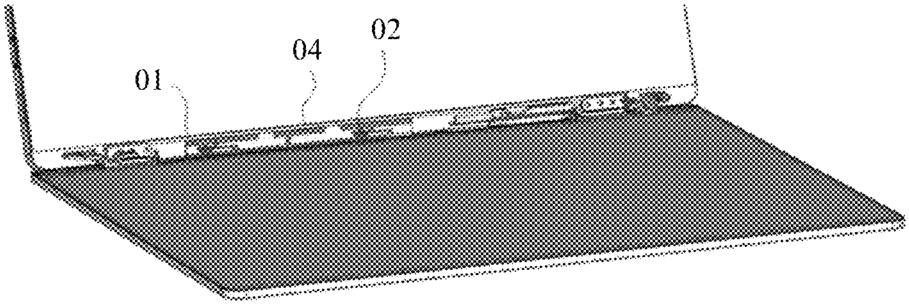
FIG. 1*c* is a schematic structural diagram of a terminal notebook computer.

FIG. 1*b* that is a schematic structural diagram of an antenna having a T-shaped decoupling structure. The antenna includes two IFA antenna units and the T-shaped decoupling structure 04 between the two IFA antenna units. During excitation of a first feed point 01, the T-shaped decoupling structure 04 generates a resonant frequency that is the same as operating frequency bands of the IFA antenna units, so that part of a current is coupled to the T-shaped decoupling structure 04 through the antenna floor 01, thereby reducing an amount of the current flowing to the second feed point 02, and increasing an isolation between the two IFA antenna units.

Because a length of the IFA antenna unit is related to a frequency, a higher frequency indicates a shorter wavelength and a shorter length of the IFA antenna unit; and a lower frequency indicates a longer wavelength and a longer length of the IFA antenna unit. For example, the IFA antenna unit in FIG. 1*b* includes two radiation stubs, to cover two operating frequency bands: 2.4 GHz and 5 GHz. A length of the longer radiation stub is a quarter of a wavelength corresponding to 2.4 GHz; and a length of the shorter radiation stub is a quarter of a wavelength corresponding to 5 GHz. It can be determined, through calculation, that a total antenna length d1 of the IFA antenna units is 30 mm according to a relationship between a wavelength and a frequency. The T-shaped decoupling structure 04 implements decoupling by generating a resonant frequency that is the same as the operating frequency band of the IFA antenna unit. Therefore, the T-shaped decoupling structure 04 also includes two decoupling stubs of different lengths, to implement decoupling for the two frequency bands: 2.4 GHz and 5 GHz. The longer decoupling stub is configured to implement decoupling for the 2.4 GHz frequency band; and the shorter decoupling stub is configured to implement decoupling for the 5 GHz frequency band. Similarly, it can be determined, through calculation, that a total horizontal length d2 of the T-shaped decoupling structure 04 is also 30 mm. Therefore, a total horizontal length d of the antenna having the T-shaped decoupling structure 04 shown in FIG. 2 reaches at least 115 mm. However, this dimension of the antenna may not meet a requirement for miniaturization of the antenna.

This application provides a MIMO antenna, to resolve a problem that a dimension of an antenna cannot meet a requirement for miniaturization of the antenna. The following describes a structure of the MIMO antenna in this embodiment of this application with reference to the accompanying drawings.

First, the antenna decoupling structure of the MIMO antenna is described below.

Figure 2A:
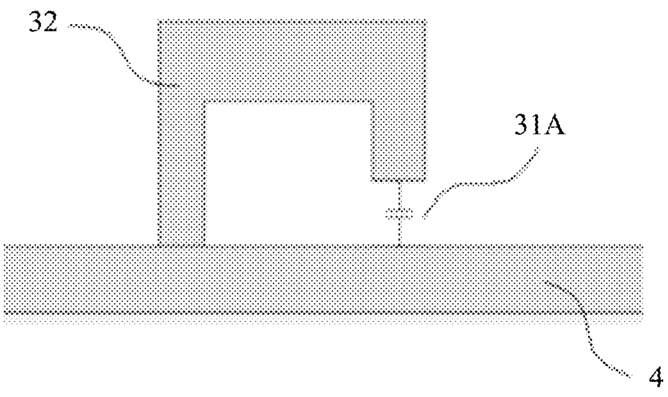
FIG. 2*a* is a schematic structural diagram of an antenna decoupling structure according to an embodiment of this application.

FIG. 2*a* is a schematic structural diagram of an antenna decoupling structure according to an embodiment of this application. The antenna decoupling structure 3 includes a capacitor structure and a grounding stub 32 connected to the capacitor structure. A first end of the grounding stub 32 is connected to an antenna floor 4, to form an equivalent inductor L. A first end of the capacitor structure is connected to the antenna floor 4, and a second end of the capacitor structure is connected to a second end of the grounding stub 32, so that the equivalent inductor L and the capacitor structure form an LC resonant structure.

In this embodiment of this application, a capacitance of the capacitor structure and an inductance of the equivalent inductor L are adjusted to ensure that a resonant frequency of the LC resonant structure is the same as the target decoupling frequency band, thereby implementing decoupling. The antenna decoupling structure 3 in this embodiment of this application mainly includes the capacitor structure and the grounding stub 32 that is used for forming the equivalent inductor L. To reduce a size of the antenna decoupling structure 3, that is, shorten a coupling path of a current, it needs to be ensured that a size of the grounding stub 32 is as small as possible. Then, the capacitance is adjusted according to a relationship between a resonant frequency, and an inductance and a capacitance, to ensure that the resonant frequency of the LC resonant structure is the same as the target decoupling frequency band. A specific shape and size of the antenna decoupling structure 3 in this embodiment of this application may be determined through simulation and experiments according to a decoupling requirement for the target decoupling frequency band.

Figure 2B:
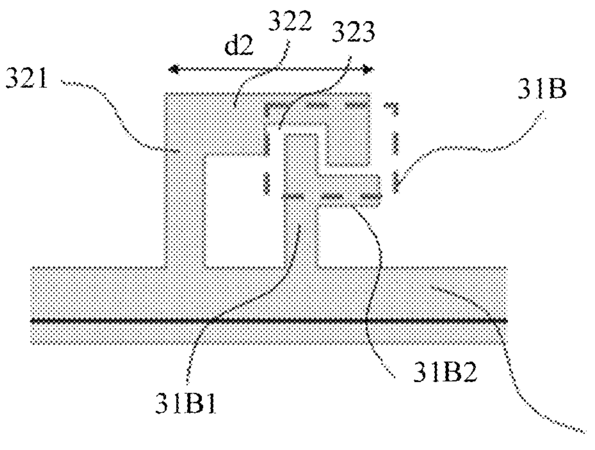
FIG. 2*b* is a schematic structural diagram of another antenna decoupling structure according to an embodiment of this application.

The capacitor structure is not limited in this embodiment of this application. In an implementation, as shown in FIG. 2*a*, a lumped parameter capacitor 31A may be connected in series between the second end of the grounding stub 32 and the antenna floor 4. In another implementation, as shown in FIG. 2*b*, a capacitive coupling stub 31B is added. A second end of the capacitive coupling stub 31B is connected to the antenna floor 4; and a first end of the capacitive coupling stub 31B is disposed opposite to the second end of the grounding stub 32 at an interval. In this way, the first end of the capacitive coupling stub 31B and the second end of the grounding stub 32 form a coupling capacitor, as shown in a dashed block in FIG. 2*b*. The coupling capacitor is a capacitor structure. The capacitor structure may be a standard capacitor board structure, or a 3D coupling capacitor structure. An area, opposite to the first end of the capacitive coupling stub 31B, of the second end of the grounding stub 32 is a coupling area of the coupling capacitor. A distance between the second end of the grounding stub 32 and the first end of the capacitive coupling stub 31B is a coupling distance. In this embodiment of this application, it may be considered that a height of a gap between the second end of the grounding stub 32 and the first end of the capacitive coupling stub 31B is equivalent to the coupling distance. A capacitance of the coupling capacitor is in direct proportion to the coupling area, but is in inverse proportion to the coupling distance. Therefore, the capacitance can be increased by increasing the coupling area or decreasing the coupling distance. Neither of shapes of the capacitive coupling stub 31B and the grounding stub 32 is limited in this embodiment of this application, provided that the capacitive coupling stub 31B and the grounding stub 32 are at least partially opposite to each other in an up-down direction.

In an implementation, the capacitor structure may be that shown in FIG. 2*b*. The grounding stub 32 may include a first grounding sub-stub 321 and a second grounding sub-stub 322 that are disposed in an L-shaped form, a first end of the first grounding sub-stub 321 is perpendicularly connected to the antenna floor 4, a second end of the first grounding sub-stub 321 is perpendicularly connected to a first end of the second grounding sub-stub 322, and a first groove 323 is formed in a side, facing the antenna floor 4, of the second grounding sub-stub 322. Correspondingly, the capacitive coupling stub 31B includes a first capacitive coupling sub-stub 31B1 and a second capacitive coupling sub-stub 31B2 that are disposed in a T-shaped form, a first end of the first capacitive coupling sub-stub 31B1 is disposed in the first groove 323 and opposite to the first groove 323 at an interval, a second end of the first capacitive coupling sub-stub 31B1 is perpendicularly connected to the antenna floor 4, a first end of the second capacitive coupling sub-stub 31B2 is perpendicularly connected to the first capacitive coupling sub-stub 31B1, and the second capacitive coupling sub-stub 31B2 is disposed opposite to a second end of the second grounding sub-stub 322 at an interval. In this way, the first groove is formed in the grounding stub 32, and a structure of the capacitive coupling stub 31B is designed to T-shaped to match the first groove, so that a plurality of coupling slots are formed between the capacitive coupling stub 31B and the grounding stub 32, which increases a capacitance of the coupling capacitor.

Figure 5A:
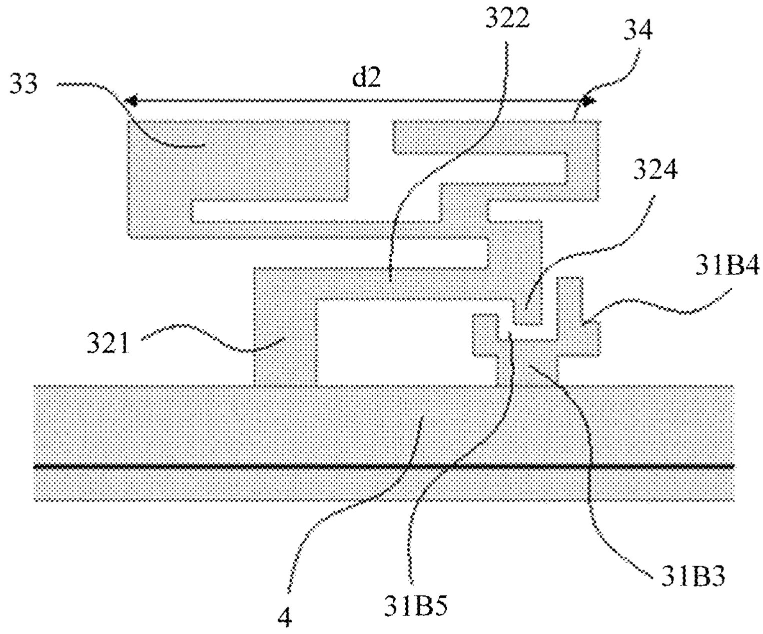
FIG. 5*a* is a schematic structural diagram of still another antenna decoupling structure according to an embodiment of this application.

In another implementation, the capacitor structure may be that shown in FIG. 5*a*. A third grounding sub-stub 324 is connected to the second end of the second grounding sub-stub 322, a first end of the third grounding sub-stub 324 is perpendicularly connected to the second end of the second grounding sub-stub 322, and a second end of the third grounding sub-stub 324 faces the antenna floor 4. Correspondingly, the capacitive coupling stub 31B includes a third capacitive coupling sub-stub 31B3 and a fourth capacitive coupling sub-stub 31B4, a first end of the third capacitive coupling sub-stub 31B3 is perpendicularly connected to the antenna floor 4, a second end of the third capacitive coupling sub-stub 31B3 is perpendicularly connected to the fourth capacitive coupling sub-stub 31B4, a second groove 31B5 is formed in a side, away from the antenna floor 4, of the fourth capacitive coupling sub-stub 31B4, and the second end of the third grounding sub-stub 324 is disposed in the second groove 31B5 and opposite to the second groove 31B5 at an interval. In this way, the second groove is formed in the capacitive coupling stub, and the third grounding sub-stub disposed opposite to the second groove at an interval is designed on the grounding stub in a matching manner, so that the plurality of coupling slots are formed between the capacitive coupling stub 31B and the grounding stub 32, which increases a capacitance of the coupling capacitor.

Because a resonant frequency of the antenna decoupling structure provided in this embodiment of this application depends on the inductance and the capacitance that correspond to the LC resonant structure, antenna miniaturization can be realized by reducing a size of each portion of the decoupling structure.

Decoupling for two frequency bands 2.4 GHz and 5 GHz is used as an example. A horizontal length d2 of the antenna decoupling structure 3 in FIG. 2*b* is 10 mm, and is 20 mm shorter than that of the T-shaped decoupling structure. Therefore, a requirement for miniaturization of an antenna can be met by applying, to the antenna, the antenna decoupling structure provided in this embodiment of this application.

Figure 2C:
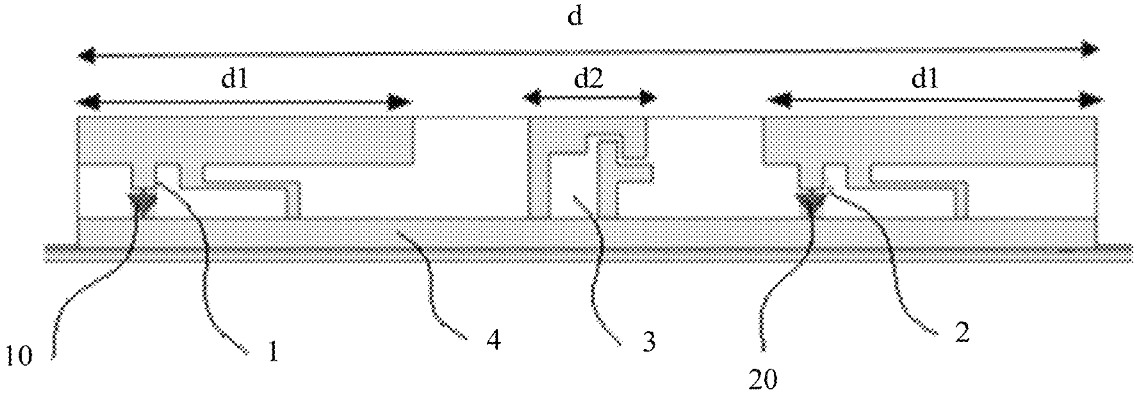
FIG. 2*c* is a schematic structural diagram of a MIMO antenna according to an embodiment of this application.

FIG. 2*c* is a schematic structural diagram of a MIMO antenna according to an embodiment of this application. The MIMO antenna includes a first antenna unit 1, a second antenna unit 2, and the antenna decoupling structure 3 according to the foregoing embodiment. The antenna decoupling structure 3 is disposed at a preset location between the first antenna unit 1 and the second antenna unit 2.

Structures of the first antenna unit 1 and the second antenna unit 2 are not limited in this embodiment of this application. For example, the first antenna unit 1 may be an IFA antenna, a PIFA antenna, a left-handed antenna, or the like; and a structure of the second antenna unit 2 may be the same as or different from that of the first antenna unit 1.

Operating frequency bands of the first antenna unit 1 and the second antenna unit 2 are not limited in this application. The first antenna unit 1 and the second antenna unit 2 may have at least one same operating frequency band. For example, if operating frequency bands of the first antenna unit 1 are 2.4 GHz and 3.8 GHz, and operating frequency bands of the second antenna unit 2 are 2.4 GHz and 5 GHz, the first antenna unit 1 and the second antenna unit 2 have one same operating frequency band: 2.4 GHz. For another example, if operating frequency bands of the first antenna unit 1 are 2.4 GHz and 5 GHz, and operating frequency bands of the second antenna unit 2 are 2.4 GHz and 5 GHz, the first antenna unit 1 and the second antenna unit 2 have two same operating frequency bands: 2.4 GHz and 5 GHz, that are two common operating frequency bands of existing WIFI antennas.

A target decoupling frequency band of the antenna decoupling structure 3 is not limited in this embodiment of this application. For example, the antenna decoupling structure 3 may be configured to implement decoupling for any one or two of frequency bands: 2.4 GHz, 3.8 GHz, and 5 GHz. In other words, the antenna decoupling structure 3 in this embodiment of this application can decouple a single-band antenna or a dual-band antenna. If the antenna decoupling structure 3 is configured to decouple a single-band antenna, that is, the first antenna unit 1 and the second antenna unit 2 have a same operating frequency band, parameters corresponding to the antenna decoupling structure 3 (these parameters include a shape and a size of the grounding stub, a capacitance of the capacitor structure, and the like) can resonate with a frequency that is the same as the target decoupling frequency band. If the antenna decoupling structure 3 is configured to decouple a dual-band antenna, that is, the first antenna unit 1 and the second antenna unit 2 have two same operating frequency bands, the parameters corresponding to the antenna decoupling structure 3 can form two resonant modes. The two resonant modes can respectively resonate with frequencies that are the same as the two target decoupling frequency bands.

The following further describes the MIMO antenna having the antenna decoupling structure 3 capable of decoupling two frequency bands: 2.4 GHz and 5.5 GHz.

Figure 2D:
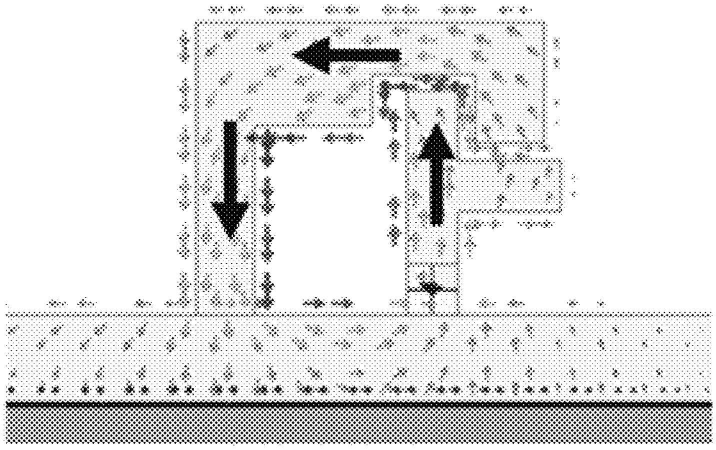
FIG. 2*d* is a schematic diagram of a current mode of the antenna decoupling structure in FIG. 2*c* under an excitation condition of a 2.4 GHz frequency band.
Figure 2E:
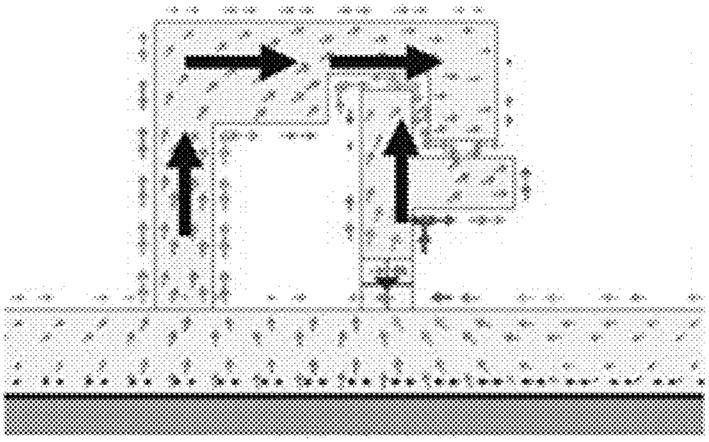
FIG. 2*e* is a schematic diagram of a current mode of the antenna decoupling structure in FIG. 2*c* under an excitation condition of a 5.5 GHz frequency band.

As shown in FIG. 2*c*, the first antenna unit 1 and the second antenna unit 2 have two same operating frequency bands: 2.4 GHz and 5.5 GHz. The antenna decoupling structure 3 may be determined through simulation and experiments, to implement decoupling for two frequency bands: 2.4 GHz and 5.5 GHz, so that under an excitation condition of the 2.4 GHz frequency band, a left-handed mode in the antenna decoupling structure 3 is a strongest resonant mode, as a current mode shown in FIG. 2*d*; and under an excitation condition of the 5.5 GHz frequency band, a loop mode in the antenna decoupling structure 3 is a strongest resonant mode, as a current mode shown in FIG. 2*e*. The excitation condition of the 2.4 GHz frequency band is used as an example. During excitation of a first feed point 10, a current flowing through the antenna floor 4 indirectly excites the antenna decoupling structure 3, and the current mode shown in FIG. 2*d* is formed in the antenna decoupling structure 3, so that the LC resonant structure can generate a 2.4 GHz resonant frequency. Therefore, the current flowing through the antenna floor 4 is coupled to the LC resonant structure, which reduces a current flowing to a second feed point 20, and increases an isolation between the first antenna unit and the second antenna unit. The first feed point 10 is a feed point of the first antenna unit 1. The second feed point 20 is a feed point of the second antenna unit 2.

In this embodiment of this application, the antenna decoupling structure 3 capable of decoupling a 2.4 GHz and 5.5 GHz dual-band antenna is determined through simulation and experiments. As shown in FIG. 2*c*, a horizontal length d2 is 10 mm. It can be determined, through calculation, that lengths d1 of the first antenna unit and the second antenna unit are both 30 mm according to a relational expression between a wavelength and a frequency. A total horizontal length d of the MIMO antenna is 85 mm. Compared with the MIMO antenna in FIG. 1*b*, the MIMO antenna in FIG. 2*c* has a smaller size, thereby meeting a requirement for miniaturization of the antenna.

Figure 2F:
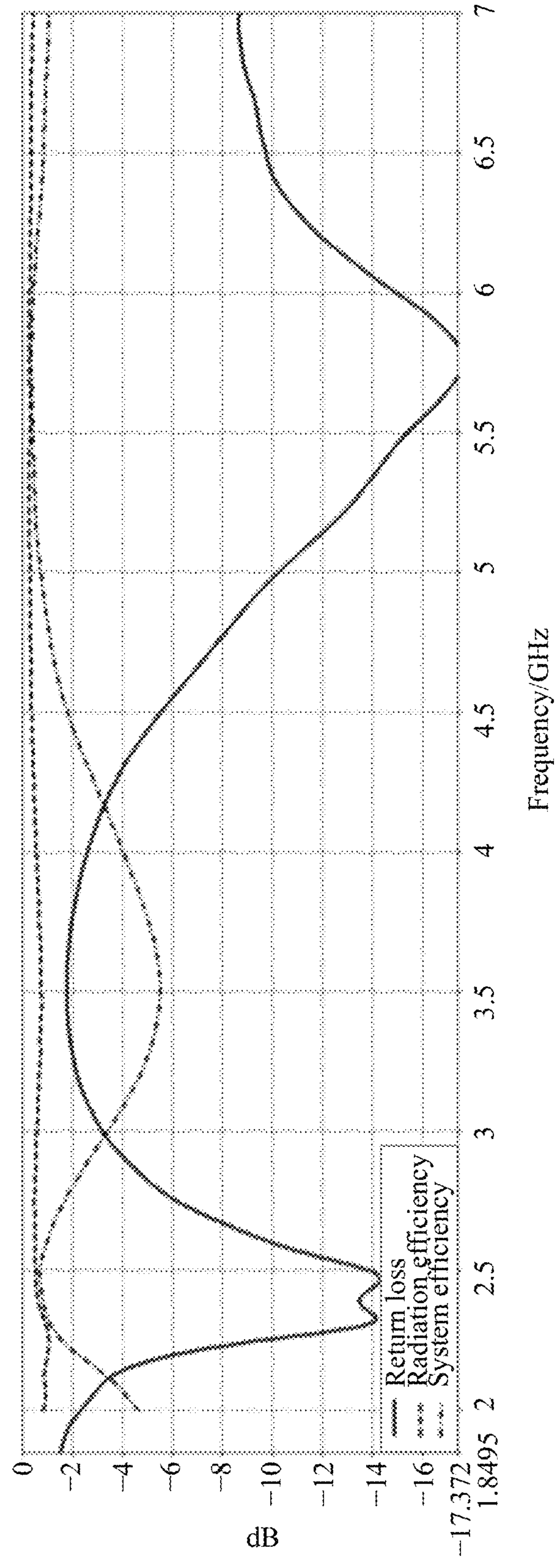
FIG. 2*f* is a diagram of a performance curve of a first antenna unit in FIG. 2*c;*
Figure 2G:
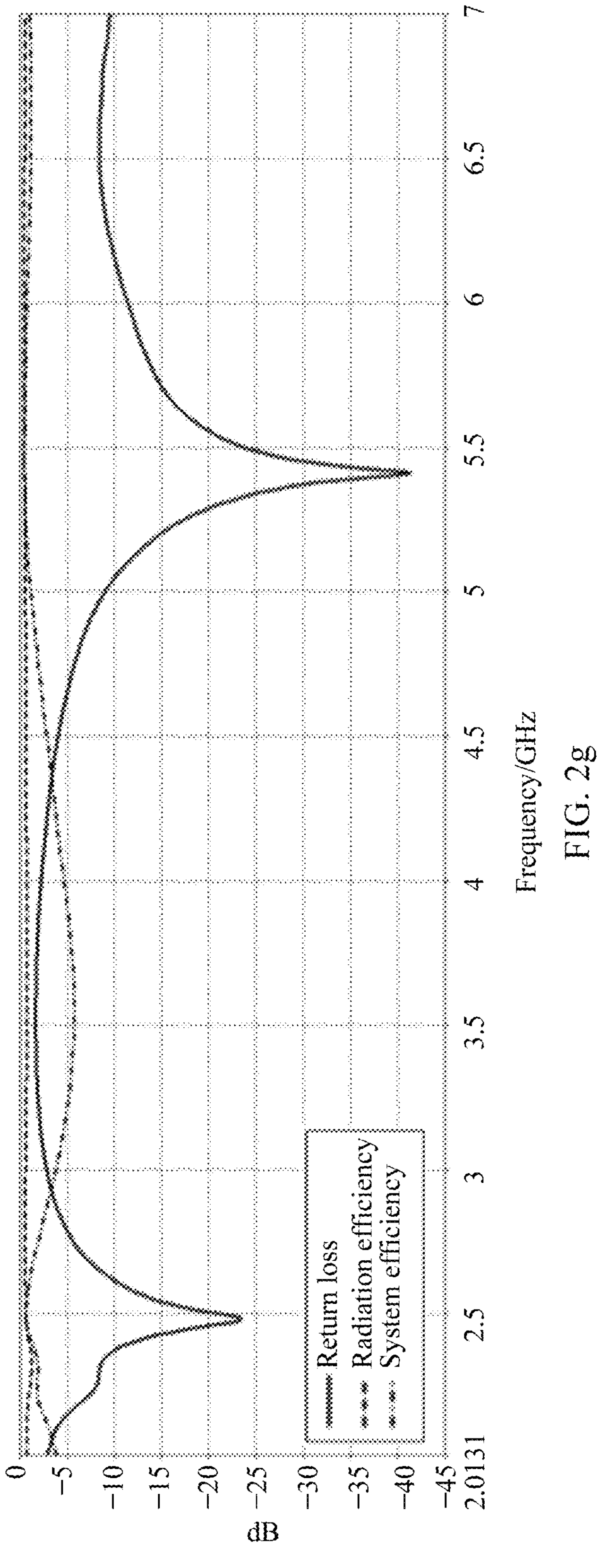
FIG. 2*g* is a diagram of a performance curve of a second antenna unit in FIG. 2*c;*
Figure 2H:
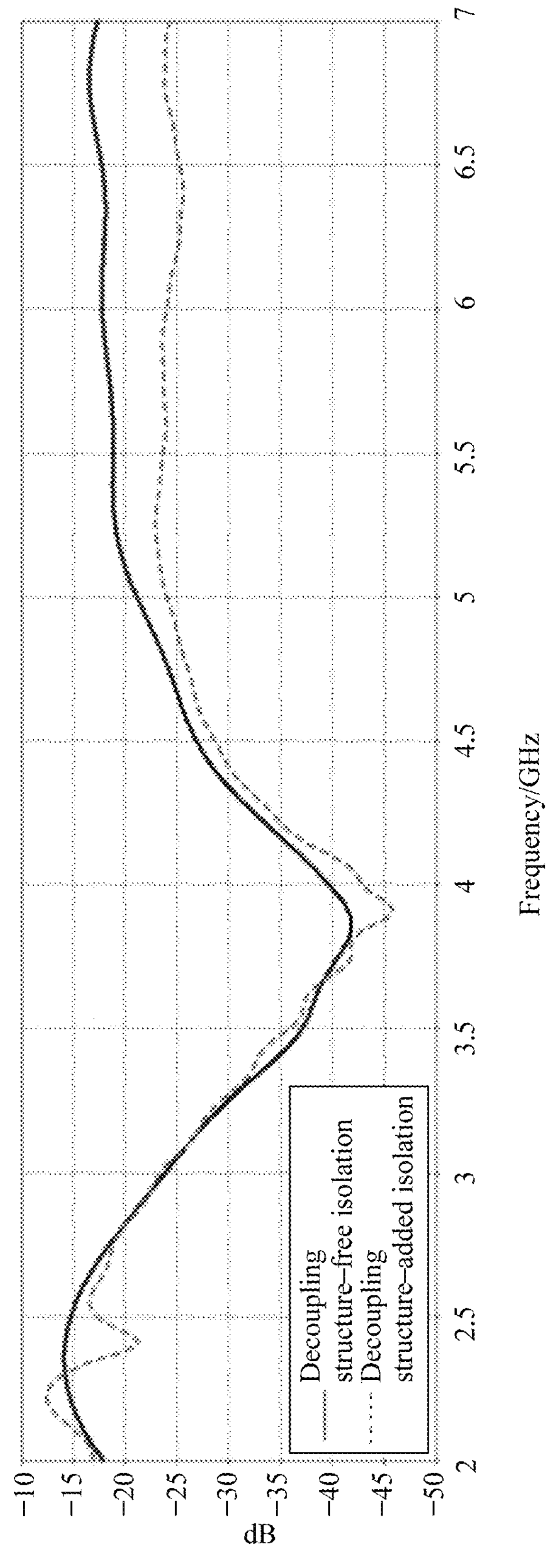
FIG. 2*h* is a diagram of comparison between isolation curves of the MIMO antenna in FIG. 1*a* and the MIMO antenna in FIG. 2*c;*

Still referring to FIG. 2*f*, FIG. 2*g*, and FIG. 2*h*, FIG. 2*f* shows a performance curve of the first antenna unit 1 in FIG. 2*c* in a simulation experiment; FIG. 2*g* shows a performance curve of the second antenna unit 2 in FIG. 2*c* in a simulation experiment; and FIG. 2*h* shows isolation curves of the MIMO antenna in FIG. 1*a* and the MIMO antenna in FIG. 2*c* in a simulation experiment. Each of the performance curves of the first antenna unit 1 and the second antenna unit 2 includes a return loss, radiation efficiency, and system efficiency. Both units of the radiation efficiency and the system efficiency may be dB. If values of the radiation efficiency and the system efficiency are represented by using a counting unit dB, a value closer to 0 dB indicates that the radiation efficiency and the system efficiency are closer to 100%. It can be learned, from curves of return losses in FIG. 2*f* and FIG. 2*g*, that the first antenna unit 1 and the second antenna unit 2 have two same operating frequency bands: 2.4 GHz and 5.5 GHz. It can be learned, from FIG. 2*f*, that both the radiation efficiency and the system efficiency of the first antenna unit 1 at the two operating frequency bands of 2.4 GHz and 5.5 GHz are close to 100%. It can be learned, from FIG. 2*g*, that both the radiation efficiency and the system efficiency of the second antenna unit 2 at the two operating frequency bands of 2.4 GHz and 5.5 GHz are close to 100%. It can be learned, from FIG. 2*h*, that after the antenna decoupling structure 3 in this embodiment of this application is added, both isolations at the frequency bands of 2.4 GHz and 5.5 GHz are increased by about 5 dB, so that the isolations at the frequency bands of 2.4 GHz and 5.5 GHz are about −22 dB and −24 dB, respectively, thereby completely meeting an isolation requirement.

In summary, all of the radiation efficiency, the system efficiency, and the isolation of the MIMO antenna provided in the foregoing embodiment of this application are satisfactory. In addition, the horizontal dimension d2 of the antenna decoupling structure 3 is 20 mm shorter than that of the T-shaped decoupling structure 04.

An embodiment of this application further provides a structure of an antenna unit. The structure of the antenna unit may be the first antenna unit in the foregoing embodiment.

Figure 3A:
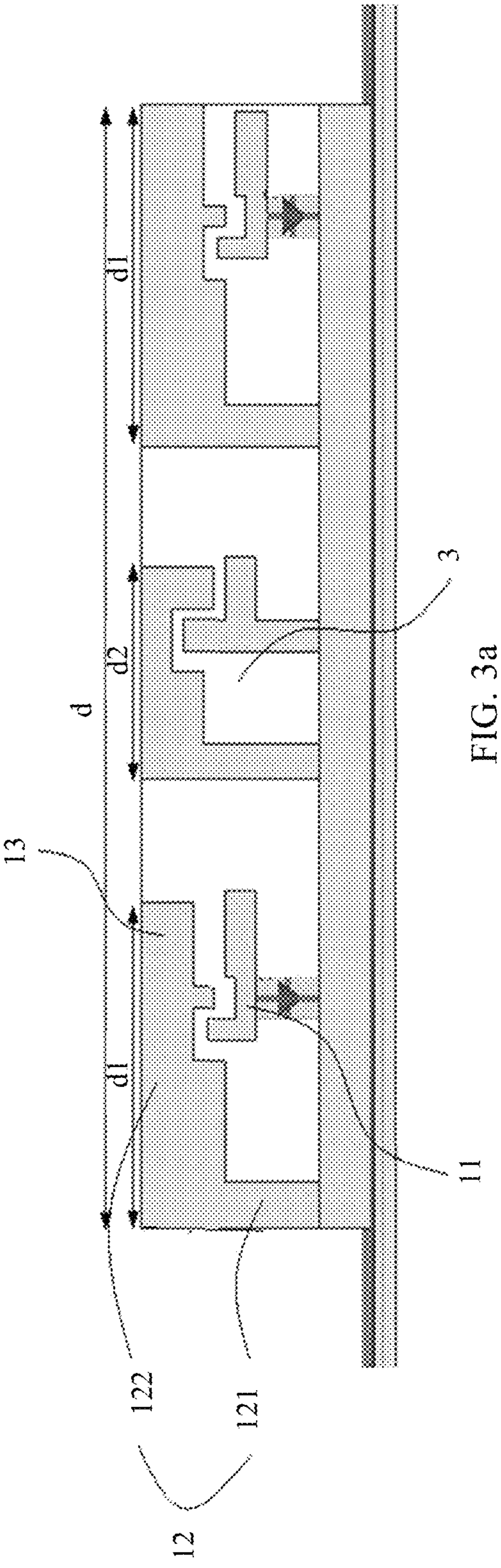
FIG. 3*a* is a schematic structural diagram of another MIMO antenna according to an embodiment of this application.

FIG. 3*a* is a schematic structural diagram of another MIMO antenna according to an embodiment of this application. In a first antenna unit 1 in this MIMO antenna, a feed stub 11, a floor stub 12, and a first radiation stub 13 constitute two antenna modes: a left-handed antenna mode and a first monopole antenna mode that can resonate with different frequencies. A structure of the second antenna unit 2 may be the same as or different from that of the first antenna unit 1. This is not limited in this application.

As shown in FIG. 3*a*, the left-handed antenna mode of the first antenna unit 1 includes the feed stub 11 and the floor stub 12. The floor stub 12 includes a first floor sub-stub 121 and a second floor sub-stub 122. A first end of the first floor sub-stub 121 is connected to the antenna floor 4. A second end of the first floor sub-stub 121 is connected to a first end of the second floor sub-stub 122. A second end of the second floor sub-stub 122 is disposed opposite to the feed stub 11 at an interval, to form a coupling capacitor. In this way, the floor stub 12 and the feed stub 11 form a left-handed antenna mode, and a parameter corresponding to the left-handed antenna mode meets a frequency requirement for the first antenna unit at a first operating frequency band. The first operating frequency band may be any one of the following frequency bands: 2.4 GHz, 3.8 GHz, 5.5 GHz, 6.2 GHz, 7.1 GHz, and the like. This is not limited in this embodiment of this application.

It can be ensured, by adjusting shapes and sizes of the floor stub 12 and the feed stub 11 and performing determining with reference to simulation and experiments, that the parameter corresponding to the left-handed antenna mode meets a communications requirement for the first antenna unit at the first operating frequency band. For details about the left-handed antenna mode, refer to description of the LC resonant structure in the foregoing embodiment. In the left-handed antenna mode, a feed point is connected to a capacitor in series and then connected to a radiator for radiation. Owing to existence of a distributed capacitor, a resonant frequency of the left-handed antenna mode depends on an equivalent inductance and capacitance of the composite structure, so that the left-handed antenna mode has a small size. A difference between the left-handed antenna mode and the LC resonant structure lies in that resonance of the left-handed antenna mode is directly excited by the first feed point 10 of the first antenna unit 1, but resonance of the LC resonant structure is indirectly excited by exciting a current generated by the first feed point 10 to flow through the antenna floor. A structure of the coupling capacitor formed in the left-handed antenna mode is not limited in this application. For details, refer to the capacitor structure of the LC resonant structure in the foregoing embodiment.

A resonant frequency of a left-handed antenna depends on an inductance and a capacitance. Compared with a length of an IFA antenna, a monopole antenna, or another antenna that can be as small as a quarter of a wavelength, a length of the left-handed antenna can be as small as one eighth of the wavelength. Therefore, a size of the first antenna unit 1 can be further reduced. The first monopole antenna mode of the first antenna unit 1 includes the feed stub 11 and the first radiation stub 13. The second end of the second floor sub-stub 122 is connected to the first radiation stub 13, the first radiation stub 13 and the feed stub 11 form a first monopole antenna mode, and a parameter corresponding to the first monopole antenna mode meets a frequency requirement for the first antenna unit 1 at a second operating frequency band. The second operating frequency band may be different from the first operating frequency band, and may be any one of the following operating frequency bands: 2.4 GHz, 3.8 GHz, 5.5 GHz, 6.2 GHz, 7.1 GHz, and the like. This is not limited in this embodiment of this application.

Transmit-to-received conversion efficiency of the antenna is highest when the length of the antenna is a quarter of a wavelength of a radio signal. Therefore, a best length of the first radiation stub 13 in the first monopole antenna mode can be obtained by calculating a wavelength based on a center transmit frequency and a center received frequency, namely, a center frequency of the second operating frequency band of the first antenna unit and dividing the wavelength by 4. For example, if the center frequency of the second operating frequency band is 2.4 GHz, a wavelength $\lambda$ corresponding to 2.4 GHz can be calculated according to a relational expression $v=f\lambda$ between a frequency f and the wavelength $\lambda$. Further, it can be calculated that a length of the first radiation stub 13 is $\lambda/4$.

It can be learned that a lower frequency corresponds to a greater length of the first radiation stub 13. Therefore, to reduce the size of the first antenna unit 1, the left-handed antenna in the first antenna unit 1 should be configured to resonant with a low frequency, and the first monopole antenna mode should be configured to resonant with a low frequency.

For example, the first operating frequency band is 2.5 GHz, and the second operating frequency band is 5 GHz. As shown in FIG. 3*a*, in the MIMO antenna, horizontal lengths d1 of the first antenna unit and the second antenna unit are both 16 mm; a horizontal length d2 of the antenna decoupling structure 3 is 10 mm; and a total horizontal length d of the antenna is 53 mm that is 32 mm shorter than the total horizontal length of the antenna in FIG. 2*c*.

In this way, the antenna unit can cover more operating frequency bands. An embodiment of this application provides another structure of an antenna unit. The structure of the antenna unit may be the first antenna unit in the foregoing embodiment.

Figure 4A:
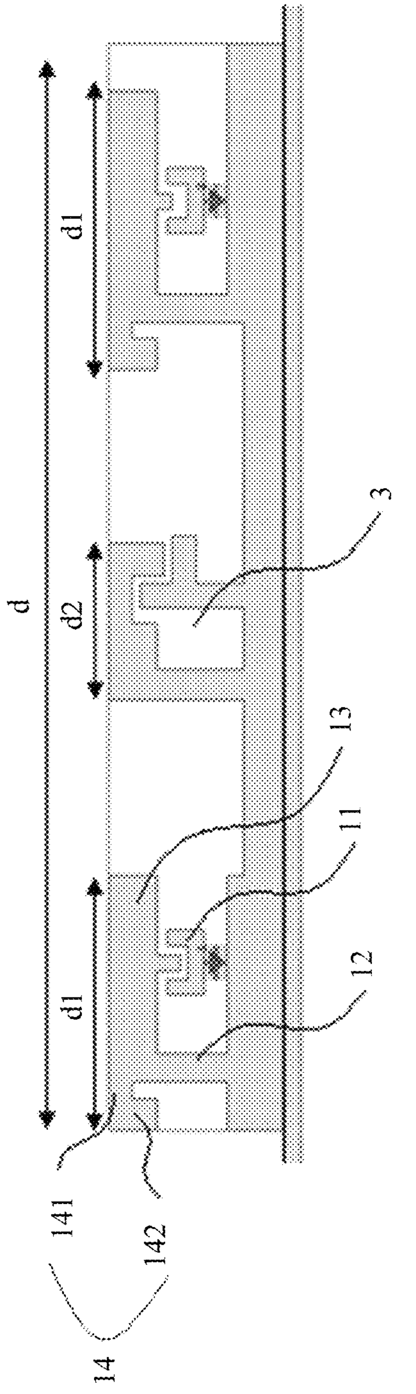
FIG. 4*a* is a schematic structural diagram of still another MIMO antenna according to an embodiment of this application.

FIG. 4*a* is a schematic structural diagram of still another MIMO antenna according to an embodiment of this application. FIG. 4*a* shows still another structure of the first antenna unit. The structure of the first antenna unit in FIG. 4*a* is substantially the same as the structure of the first antenna unit in FIG. 3*a*; and a difference between the two structures is that the first antenna unit 1 in FIG. 4*a* is additionally provided with a second radiation stub 14. The second radiation stub 14 and the first radiation stub 13 are respectively disposed on two sides of the floor stub 12. A first end of the second radiation stub 14 is connected to the first end of the second floor sub-stub 122.

The feed stub 11, the floor stub 12, the first radiation stub 13, and the second radiation stub 14 of the first antenna unit 1 in FIG. 4*a* constitute four antenna modes: a left-handed antenna mode, a first monopole antenna mode, a second monopole antenna mode, and a balanced antenna mode that can resonate with different frequencies, so that the first antenna unit 1 can cover more operating frequency bands.

As shown in FIG. 4*a*, the left-handed antenna mode and the first monopole antenna mode in this embodiment of this application are the same as those in the foregoing embodiment. Details are not described herein again.

The first radiation stub 13, the second floor sub-stub 122, the second radiation stub 14, and the feed stub 11 form the balanced antenna mode. A parameter corresponding to the balanced antenna mode meets a frequency requirement for the first antenna unit 1 at a third operating frequency band. The third operating frequency band may be any one of the following frequency bands: 2.4 GHz, 3.8 GHz, 5.5 GHz, 6.2 GHz, 7.1 GHz, and the like. This is not limited in this embodiment of this application.

The second radiation stub 14, the second floor sub-stub 122, and the feed stub 11 form the second monopole antenna mode. The second radiation stub 14 may be bent to reduce horizontal space occupied by the second radiation stub 14. For example, as shown in FIG. 4*a*, the second radiation stub 14 is divided into a horizontal radiation stub 141 and a vertical radiation stub 142 that are perpendicularly connected to each other; a first end of the horizontal radiation stub 141 is connected to the first end of the second floor sub-stub 122; a second end of the horizontal radiation stub 141 is connected to a first end of the vertical radiation stub 142; and a second end of the vertical radiation stub 142 faces the antenna floor 4. A parameter corresponding to the second monopole antenna mode meets a frequency requirement for the first antenna unit at a fourth operating frequency band. The fourth operating frequency band may be any one of the following frequency bands: 2.4 GHz, 3.8 GHz, 5.5 GHz, 6.2 GHz, 7.1 GHz, and the like. This is not limited in this embodiment of this application.

A length of the first radiation stub 13 may be a quarter of a wavelength corresponding to a center frequency of the second operating frequency band. A total length of the second radiation stub and the second floor sub-stub 122 may be a quarter of a wavelength corresponding to the fourth operating frequency band. A total length of the first radiation stub 13, the second floor sub-stub 122, and the second radiation stub 14 may be a half of a wavelength corresponding to the third operating frequency band. To implement size minimization of the first antenna unit 1, the first operating frequency band is less than the fourth operating frequency band, the fourth operating frequency band is less than the third operating frequency band, and the third operating frequency band is less than the second operating frequency band. For example, the first operating frequency band is 2.5 GHz, the second operating frequency band is 7.1 GHz, the third operating frequency band is 6.2 GHz, and the fourth operating frequency band is 5 GHz.

In summary, the first antenna unit provided in the foregoing embodiment of this application can cover a plurality of operating frequency bands by constituting a plurality of antenna modes. Therefore, the foregoing antenna unit can be applied to a WIFI MIMO tri-band antenna or an NR antenna. Operating frequency bands of the WIFI MIMO tri-band antenna are 2.4 GHz to 2.5 GHz, 5.1 GHz to 5.8 GHz, and 5.9 GHz to 7.1 GHz, respectively. Operating frequency bands of the NR antenna are 2.49 GHz to 2.69 GHz, 3.3 GHz to 3.8 GHz, and 4.4 GHz to 5 GHz, respectively.

The following describes scenarios in which the foregoing first antenna unit is applied to the WIFI MIMO tri-band antenna and the NR antenna, respectively.

The scenario in which the foregoing first antenna unit is applied to the WIFI MIMO tri-band antenna is shown in FIG. 4*a*. Horizontal lengths d1 of the first antenna unit and the second antenna unit are both 16 mm. A horizontal length d2 of the antenna decoupling structure 3 is 9.8 mm. A total horizontal length d of the MIMO antenna is 68 mm that is 17 mm shorter than the total horizontal length of the MIMO antenna in FIG. 2*c*. Still referring to FIG. 4*b*, FIG. 4*c*, FIG. 4*d*, FIG. 4*e*, FIG. 4*f*, FIG. 4*g*, and FIG. 4*h*, FIG. 4*b* is a schematic diagram of a current mode of the first antenna unit in FIG. 4*a* at the 2.5 GHz frequency band; FIG. 4*c* is a schematic diagram of a current mode of the first antenna unit in FIG. 4*a* at the 5 GHz frequency band; FIG. 4*d* is a schematic diagram of a current mode of the first antenna unit in FIG. 4*a* at the 6.2 GHz frequency band; FIG. 4*e* is a schematic diagram of a current mode of the first antenna unit in FIG. 4*a* at the 7.1 GHz frequency band; FIG. 4*f* is a diagram of a performance curve of a decoupling structure-free antenna in FIG. 4*a*; FIG. 4*g* is a diagram of a performance curve of an antenna that includes a decoupling structure and that is in FIG. 4*a*; and FIG. 4*h* is a diagram of comparison between isolation curves of the antenna in FIG. 4*a* and a decoupling structure-free antenna in FIG. 4*a*. In FIG. 4*f* and FIG. 4*g*, S1,1 denotes a curve of a return loss of the first antenna unit; S2,1 denotes a curve of a return loss of the second antenna unit; and S2,2 denotes isolation curves of the first antenna unit and the second antenna unit.

Figure 4B:
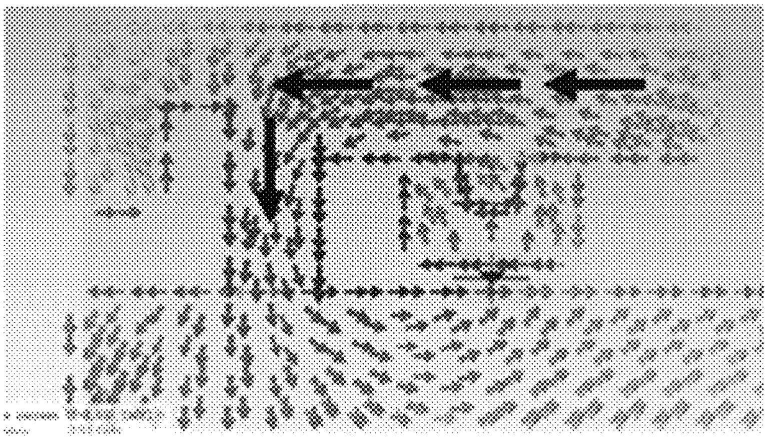
FIG. 4*b* is a schematic diagram of a current mode of a first antenna unit in FIG. 4*a* when a first feed port is excited under an excitation condition of a 2.5 GHz frequency band.
Figure 4C:
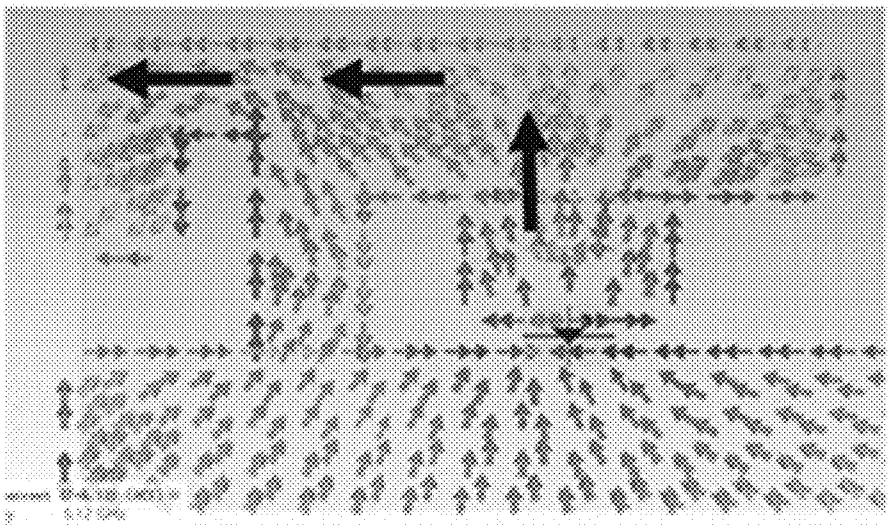
FIG. 4*c* is a schematic diagram of a current mode of a first antenna unit in FIG. 4*a* when a first feed port is excited under an excitation condition of a 5 GHz frequency band.
Figure 4D:
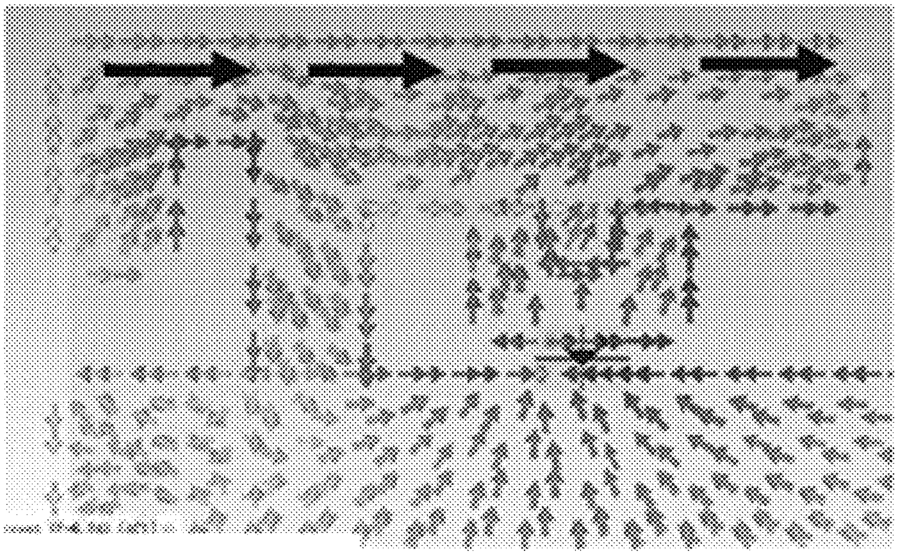
FIG. 4*d* is a schematic diagram of a current mode of a first antenna unit in FIG. 4*a* when a first feed port is excited under an excitation condition of a 6.2 GHz frequency band.
Figure 4E:
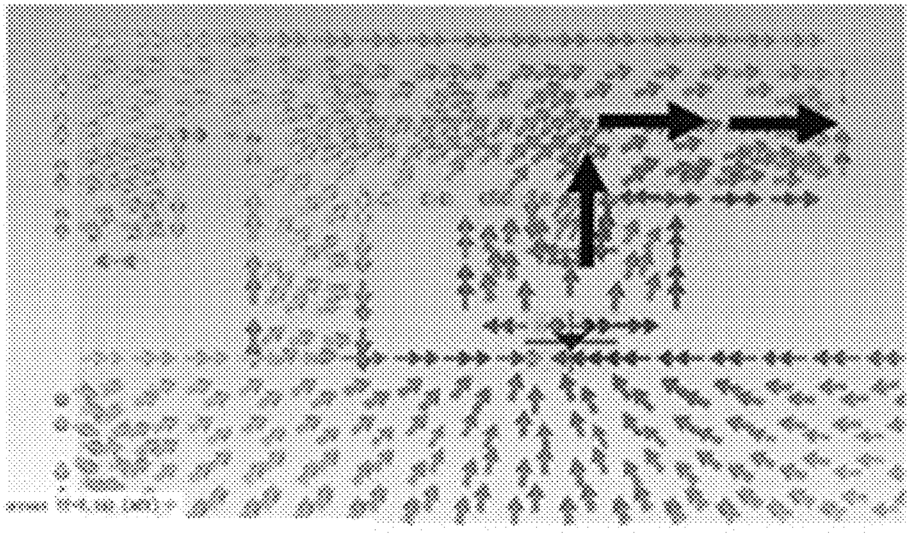
FIG. 4*e* is a schematic diagram of a current mode of a first antenna unit in FIG. 4*a* when a first feed port is excited under an excitation condition of a 7.1 GHz frequency band.
Figure 4F:
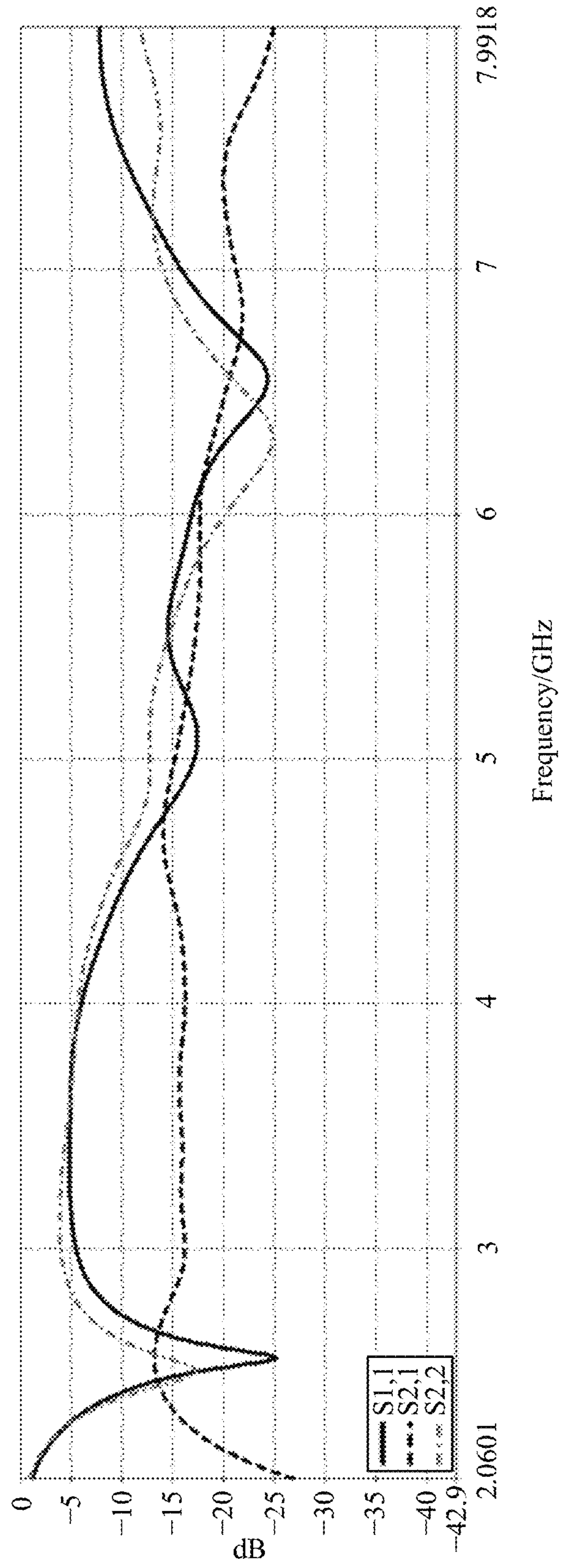
FIG. 4*f* is a diagram of a performance curve of a decoupling structure-free MIMO antenna in FIG. 4*a;*
Figure 4G:
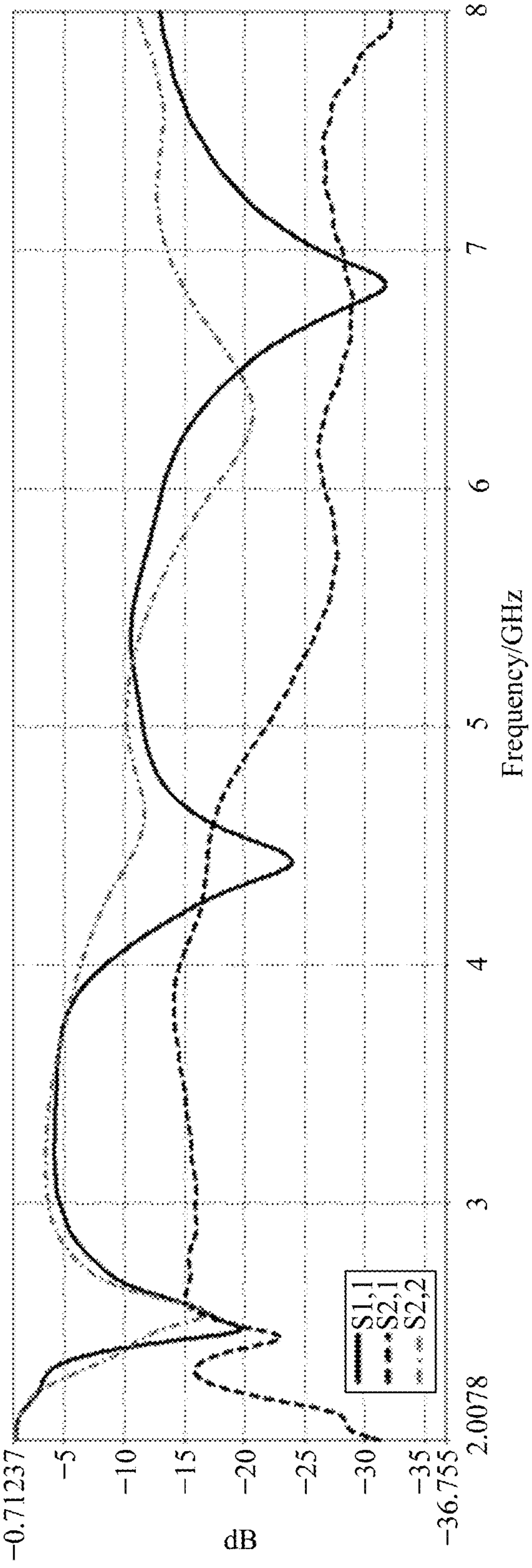
FIG. 4*g* is a diagram of a performance curve of the MIMO antenna in FIG. 4*a;*
Figure 4H:
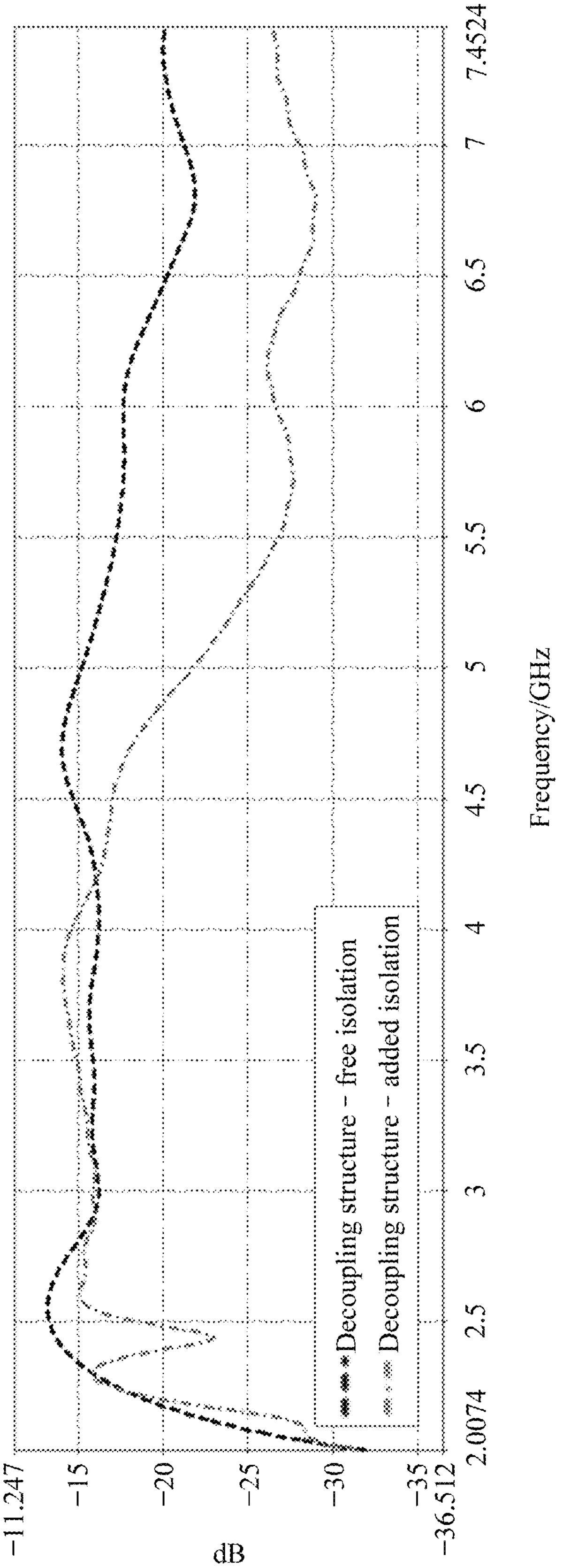
FIG. 4*h* is a diagram of comparison between isolation curves of the MIMO antenna in FIG. 4*a* and a decoupling structure-free MIMO antenna in FIG. 4*a;*

It can be learned, from FIG. 4*b*, FIG. 4*c*, FIG. 4*d*, and FIG. 4*e*, that the first antenna unit provided in the embodiments of this application is in different current modes at different operating frequency bands. As shown in FIG. 4*b*, the first antenna unit is in the left-handed antenna mode at the operating frequency band of 2.5 GHz. As shown in FIG. 4*c*, the first antenna unit is in the second monopole antenna mode at the operating frequency band of 5 GHz. As shown in FIG. 4*d*, the first antenna unit is in the balanced antenna mode at the operating frequency band of 6.2 GHz. As shown in FIG. 4*e*, the first antenna unit is in the first monopole antenna mode at the operating frequency band of 7.1 GHz.

It can be learned, from curves of return losses in FIG. 4*f* and FIG. 4*g*, that a MIMO antenna using the first antenna unit provided in this application can cover the operating frequency bands of the WIFI MIMO tri-band antenna: 2.4 GHz to 2.5 GHz, 5.1 GHz to 5.8 GHz, and 5.9 GHz to 7.1 GHz. It can be learned, from FIG. 4*h*, that after using the antenna decoupling structure 3 provided in this embodiment of this application, isolations of the antenna in FIG. 4*a* at the operating frequency bands: 2.5 GHz, 5 GHz, 6.2 GHz, and 7.1 GHz are all increased, and are all less than −23 dB, thereby completely meeting an isolation requirement.

Figure 4I:
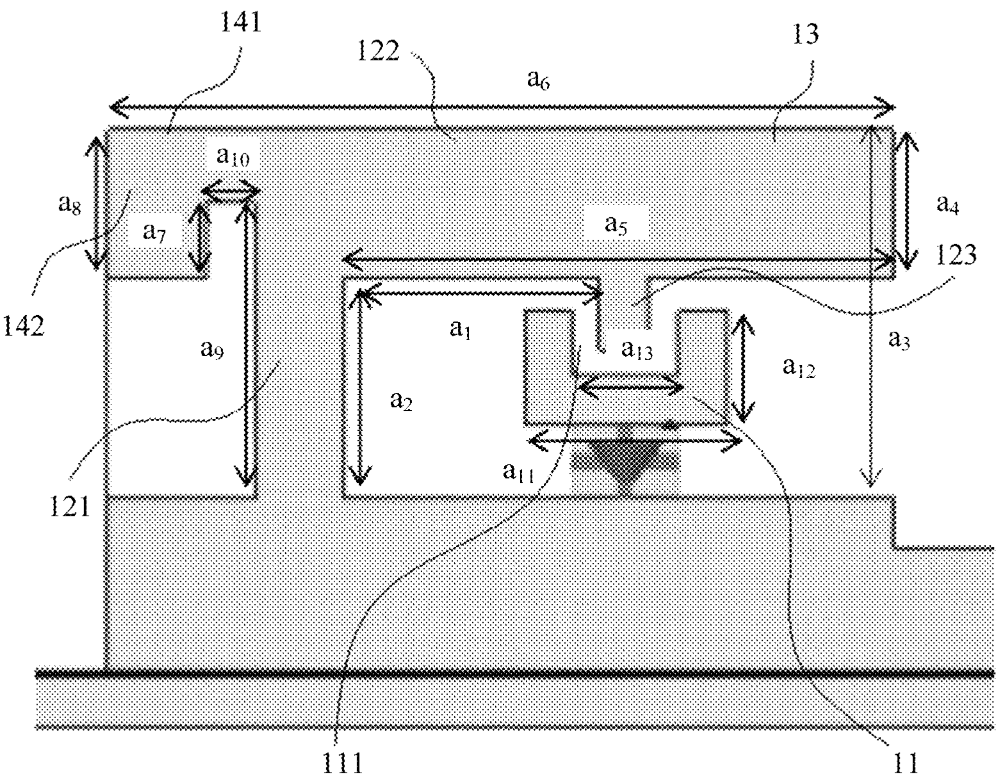
FIG. 4*i* is a diagram of dimensions of a first antenna unit in FIG. 4*a;*

FIG. 4*i* shows a size of the foregoing first antenna unit when the first antenna unit is applied to the WIFI MIMO tri-band antenna. The floor stub 12 includes a first floor sub-stub 121, a second floor sub-stub 122, and a third floor sub-stub 123. A first end of the third floor sub-stub 123 is perpendicularly connected to the second end of the second floor sub-stub 122, a third groove 111 is formed in a side, away from the antenna floor 4, of the feed stub 11, and a second end of the third floor sub-stub 123 is disposed in the third groove 111 and opposite to the third groove 111 at an interval to form the coupling capacitor. The second radiation stub 14 includes a horizontal radiation stub 141 and a vertical radiation stub 142 that are perpendicularly connected to each other; a first end of the horizontal radiation stub 141 is connected to the first end of the second floor sub-stub 122; a second end of the horizontal radiation stub 141 is connected to a first end of the vertical radiation stub 142; and a second end of the vertical radiation stub 142 faces the antenna floor 4. A shortest horizontal distance $a_1$ between the first floor sub-stub 121 and the third floor sub-stub 123 is 6 mm. A distance $a_2$ between a first side edge of the second floor sub-stub 122 and the antenna floor 4 is 4.5 mm. A distance $a_3$ between a second side edge of the second floor sub-stub 122 and the antenna floor 4 is 7.5 mm. The first side edge of the second floor sub-stub 122 is a side edge parallel to and close to the antenna floor. The second side edge of the second floor sub-stub 122 is a side edge parallel to and away from the antenna floor. A distance $a_4$ between a first side edge of the first radiation stub 13 and a second side edge of the first radiation stub 13 is 3 mm. A distance as between a second end of the first radiation stub 13 and a first side edge of the first floor sub-stub 121 is 11.2 mm. The first side edge of the first radiation stub 13 is a side edge parallel to and close to the antenna floor. The second side edge of the first radiation stub 13 is a side edge parallel to and away from the antenna floor. The first side edge of the first floor sub-stub 121 is a side edge perpendicular to the antenna floor and close to the feed stub 11. A distance as between the second end of the first radiation stub 13 and the second end of the horizontal radiation stub 141 is 16 mm. A distance $a_7$ between a first side edge of the vertical radiation stub 142 and a first side edge of the horizontal radiation stub 141 is 2 mm. A distance as between the first side edge of the vertical radiation stub 142 and a second side edge distance of the horizontal radiation stub 141 is 3 mm. A distance $a_9$ between the first side edge of the horizontal radiation stub 141 and the antenna floor 4 is 6 mm. A shortest horizontal distance $a_{10}$ between the vertical radiation stub 142 and the second floor sub-stub 122 is 1 mm. The first side edge of the vertical radiation stub 142 is a side edge parallel to and close to the antenna floor. The first side edge of the horizontal radiation stub 141 is a side edge parallel to and close to the antenna floor. The second side edge of the horizontal radiation stub 141 is a side edge parallel to and away from the antenna floor. A width $a_{11}$ of the third groove 111 is 4.14 mm. A height $a_{12}$ of the third groove 111 is 2.3 mm. A width $a_{13}$ of an opening of the third groove 111 is 2.14 mm. The opening of the third groove is at a center location in a width direction of the third groove 111.

Another antenna decoupling structure is described before the scenario in which the foregoing antenna unit is applied to the NR antenna. The antenna decoupling structure 3 can decouple more operating frequency bands, thereby matching the foregoing antenna unit and being applied to the NR antenna.

FIG. 5*a* is a schematic structural diagram of still another antenna decoupling structure 3 according to an embodiment of this application.

The antenna decoupling structure 3 provided in this embodiment of this application is substantially the same as the antenna decoupling structure 3 provided in the foregoing embodiments. A difference between the two structures is that the antenna decoupling structure 3 provided in this embodiment of this application is additionally provided with a first decoupling stub 33 and a second decoupling stub 34.

Figure 5B:
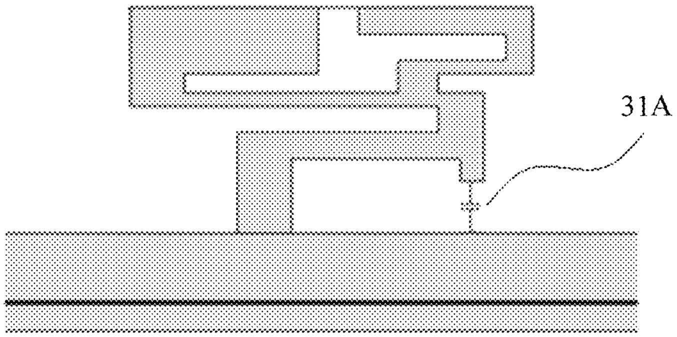
FIG. 5*b* is a schematic structural diagram of yet another antenna decoupling structure according to an embodiment of this application.

As shown in FIG. 5*a*, the antenna decoupling structure 3 provided in this embodiment of this application includes an LC resonant structure, the first decoupling stub 33, and the second decoupling stub 34. A capacitor structure in the LC resonant structure in this embodiment of this application may be formed by coupling a capacitive coupling stub 31B and a grounding stub 32 disposed opposite to the capacitive coupling stub 31B at an interval, as shown in FIG. 5*a*; or may use a lumped parameter capacitor 31A, as shown in FIG. 5*b*. For details about the LC resonant structure in this embodiment of this application, refer to description of the LC resonant structure in the foregoing embodiments. Details are not described herein again. A first end of the first decoupling stub 33 is connected to the second end of the grounding stub 32. A first end of the second decoupling stub 34 is connected to the second end of the grounding stub 32. The first decoupling stub 33 and the second decoupling stub 34 are respectively disposed on two sides of the grounding stub 32. A parameter corresponding to the LC resonant structure can meet the decoupling requirement for a first target decoupling frequency band. A length of the first decoupling stub 33 can meet the decoupling requirement for a second target decoupling frequency band. A length of the second decoupling stub 34 can meet the decoupling requirement for a third target decoupling frequency band. Shapes and sizes of the first decoupling stub 33 and the second decoupling stub 34 are not limited in this application. For example, the length of the first decoupling stub 33 may be a quarter of a wavelength corresponding to a center frequency of the second target decoupling frequency band; and the length of the second decoupling stub 34 may be a quarter of a wavelength corresponding to a center frequency of the third target decoupling frequency band. An open end formed after bending of the first decoupling stub 33 may be disposed opposite to an open end formed after bending of the second decoupling stub 34, thereby reducing space occupied by the first decoupling stub 33 and the second decoupling stub 34.

According to the antenna decoupling structure 3 in FIG. 5*a* or FIG. 5*b*, decoupling for three frequency bands can be implemented by using the LC resonant structure, the first decoupling stub 33, and the second decoupling stub 34, respectively, thereby implementing decoupling for these operating frequency bands. The LC resonant structure may be configured to implement decoupling for the lowest frequency band among the three target decoupling frequency bands, thereby obtaining a smallest size of the antenna decoupling structure 3.

The antenna decoupling structure 3 in FIG. 5*a* or FIG. 5*b* may be configured to decouple a WIFI MIMO tri-band antenna having three same operating frequency bands, or an NR antenna using 5G (5th generation mobile networks). Operating frequency bands of the WIFI MIMO tri-band antenna are 2.4 GHz to 2.5 GHz, 5.1 GHz to 5.8 GHz, and 5.9 GHz to 7.1 GHz, respectively. Operating frequency bands of the NR antenna are 2.49 GHz to 2.69 GHz, 3.3 GHz to 3.8 GHz, and 4.4 GHz to 5 GHz, respectively.

It should be understood that the antenna decoupling structure 3 in FIG. 5*a* or FIG. 5*b* may be used with the first antenna unit 1 and the second antenna unit 2 in FIG. 3*a* or FIG. 4*a*, or used with an antenna of another type. This is not limited in this application.

For example, the foregoing antenna decoupling structure and antenna unit are jointly applied to the NR antenna, that is, the first target decoupling frequency band is 2.5 GHz, the second target decoupling frequency band is 3.8 GHz, and the third target decoupling frequency band is 5.5 GHz. As shown in FIG. 5*a*, a horizontal length d2 of the antenna decoupling structure 3 is 15 mm, and is 15 mm shorter than that of an existing T-shaped decoupling structure.

Figure 5C:
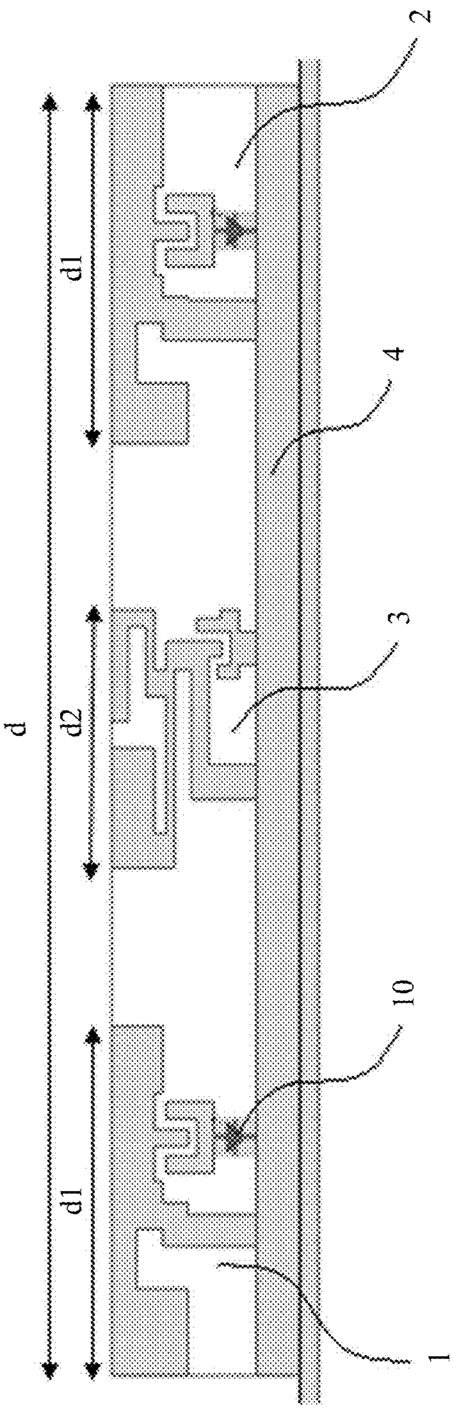
FIG. 5*c* is a schematic structural diagram of yet another MIMO antenna according to an embodiment of this application.

FIG. 5*c* is a schematic structural diagram of yet another MIMO antenna according to an embodiment of this application. The antenna includes a first antenna unit 1, a second antenna unit 2, and an antenna decoupling structure 3. The first antenna unit 1 uses the first antenna unit 1 shown in FIG. 4*a*. The antenna decoupling structure 3 uses the antenna decoupling structure 3 in FIG. 5*a* or FIG. 5*b*. A structure of the second antenna unit may be the same as that of the first antenna unit.

For example, the foregoing antenna decoupling structure and antenna unit are jointly applied to the NR antenna. According to the MIMO antenna in FIG. 5*c*, horizontal lengths d1 of the first antenna unit 1 and the second antenna unit 2 are both 20.2 mm; a horizontal length d2 of the antenna decoupling structure 3 is 15 mm; and a total horizontal length d of the MIMO antenna is 75 mm that is 40 mm shorter than the total horizontal length of the MIMO antenna in FIG. 1*b*.

Figure 5D:
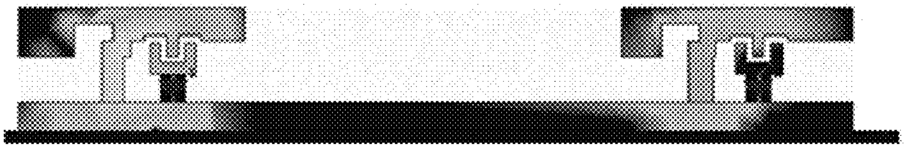
FIG. 5*d* is a schematic diagram of current distribution of an antenna decoupling structure-free MIMO antenna when a first feed port is excited under an excitation condition of a 2.5 GHz frequency band.
Figure 5E:
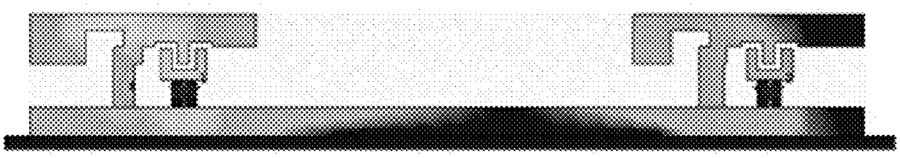
FIG. 5*e* is a schematic diagram of current distribution of an antenna decoupling structure-free MIMO antenna when a first feed port is excited under an excitation condition of a 3.8 GHz frequency band.
Figure 5F:
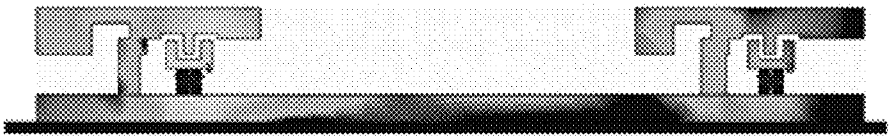
FIG. 5*f* is a schematic diagram of current distribution of an antenna decoupling structure-free MIMO antenna when a first feed port is excited under an excitation condition of a 5.5 GHz frequency band.
Figure 5G:
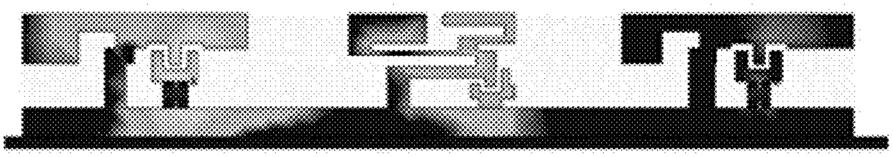
FIG. 5*g* is a schematic diagram of current distribution of the MIMO antenna in FIG. 5*c* when a first feed port is excited under an excitation condition of a 2.5 GHz frequency band.
Figure 5H:
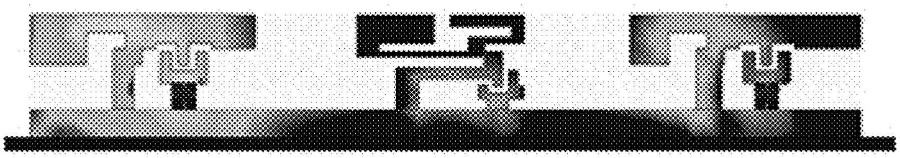
FIG. 5*h* is a schematic diagram of current distribution of the MIMO antenna in FIG. 5*c* when a first feed port is excited under an excitation condition of a 3.8 GHz frequency band.
Figure 5I:
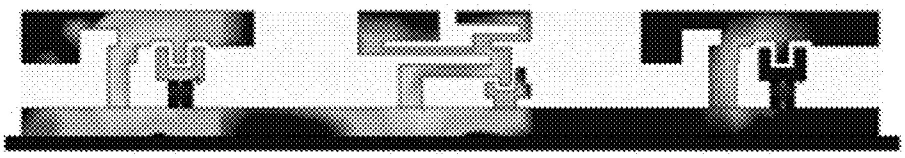
FIG. 5*i* is a schematic diagram of current distribution of the MIMO antenna in FIG. 5*c* when a first feed port is excited under an excitation condition of a 5.5 GHz frequency band.
Figure 5J:
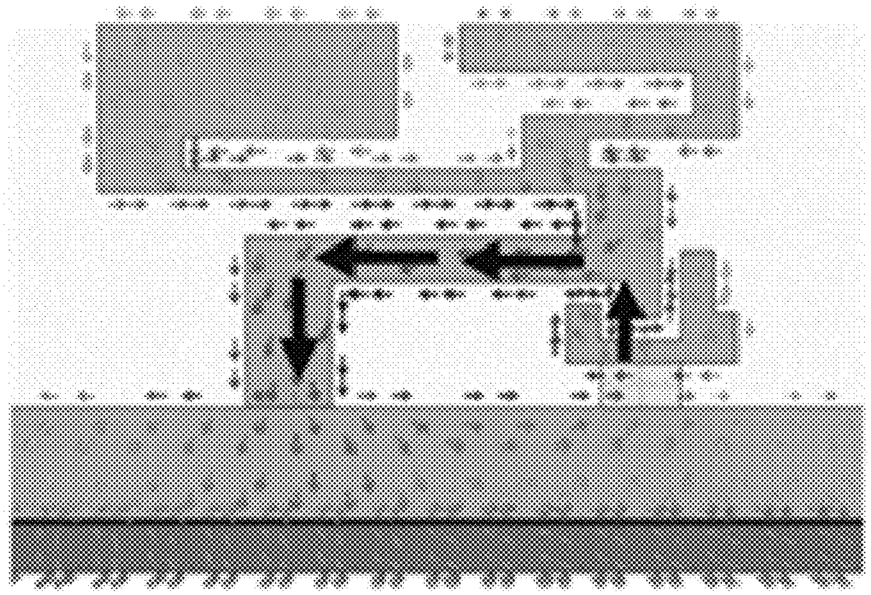
FIG. 5*j* is a schematic diagram of current distribution of an antenna decoupling structure in FIG. 5*c* when a first feed port is excited under an excitation condition of a 2.5 GHz frequency band.
Figure 5K:
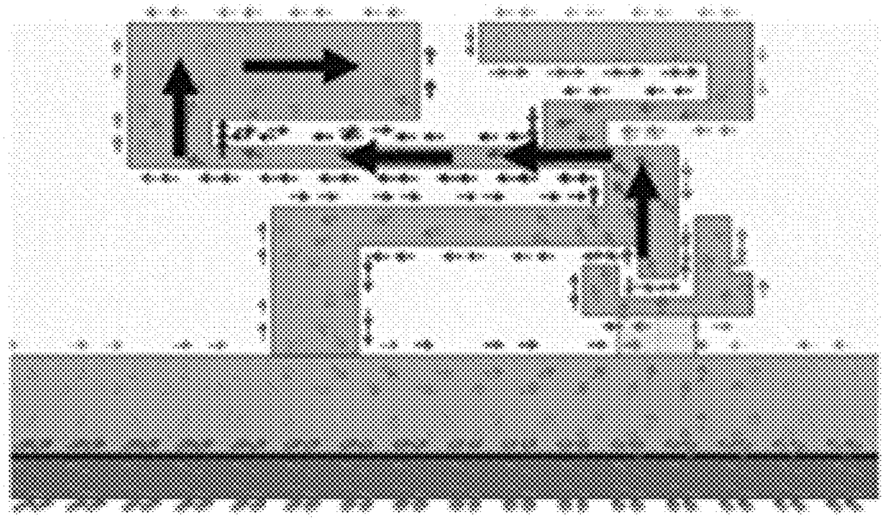
FIG. 5*k* is a schematic diagram of a current mode of an antenna decoupling structure in FIG. 5*c* when a first feed port is excited under an excitation condition of a 3.8 GHz frequency band.
Figure 5I:
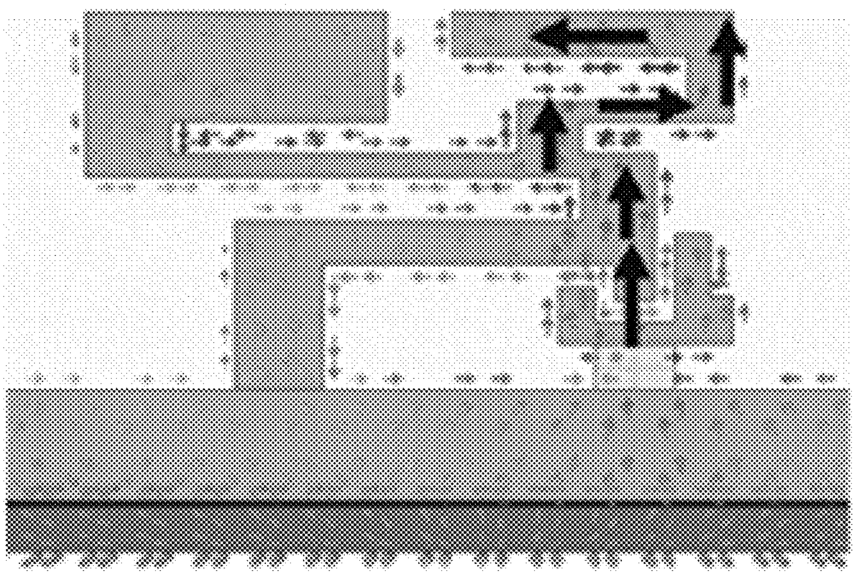
Figure 5M:
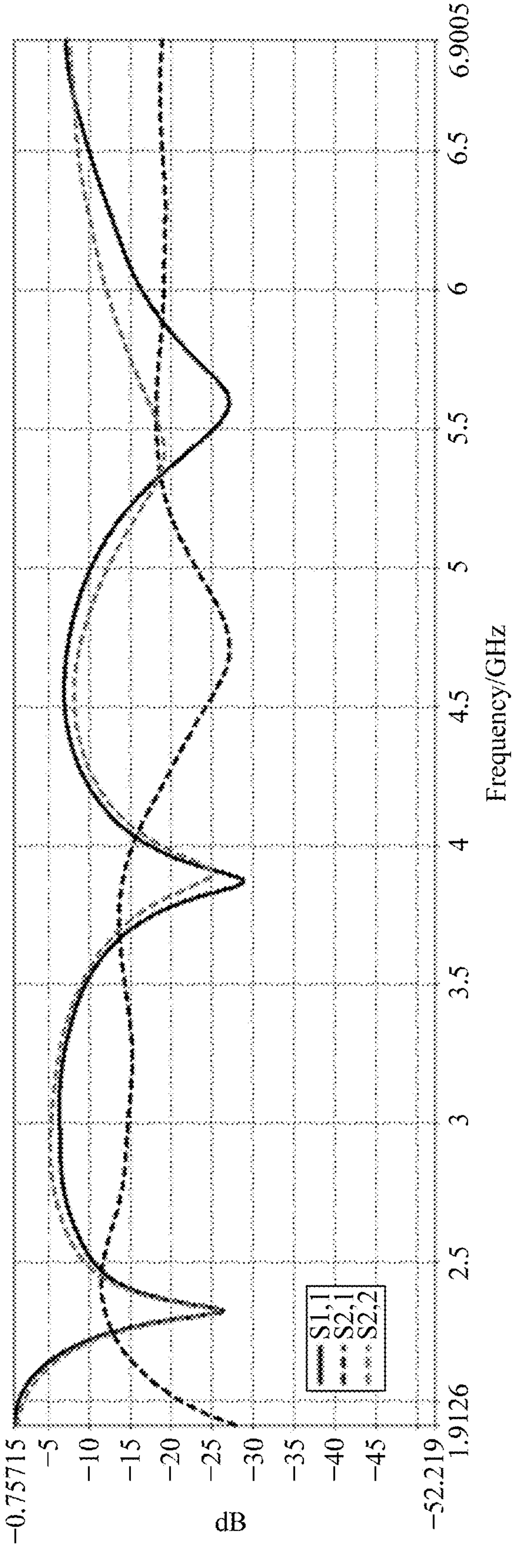
FIG. 5*m* is a diagram of a performance curve of the MIMO antenna in FIG. 5*d;*
Figure 5N:
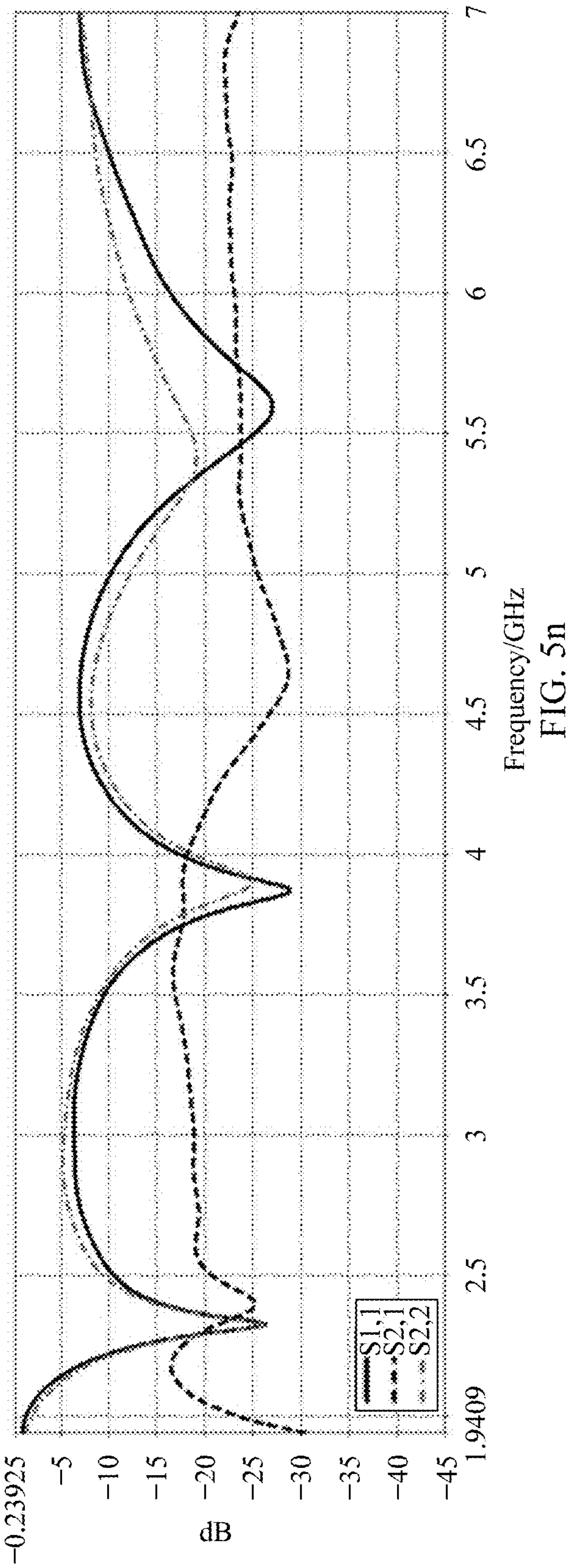
FIG. 5*n* is a diagram of a performance curve of the MIMO antenna in FIG. 5*c;*
Figure 5O:
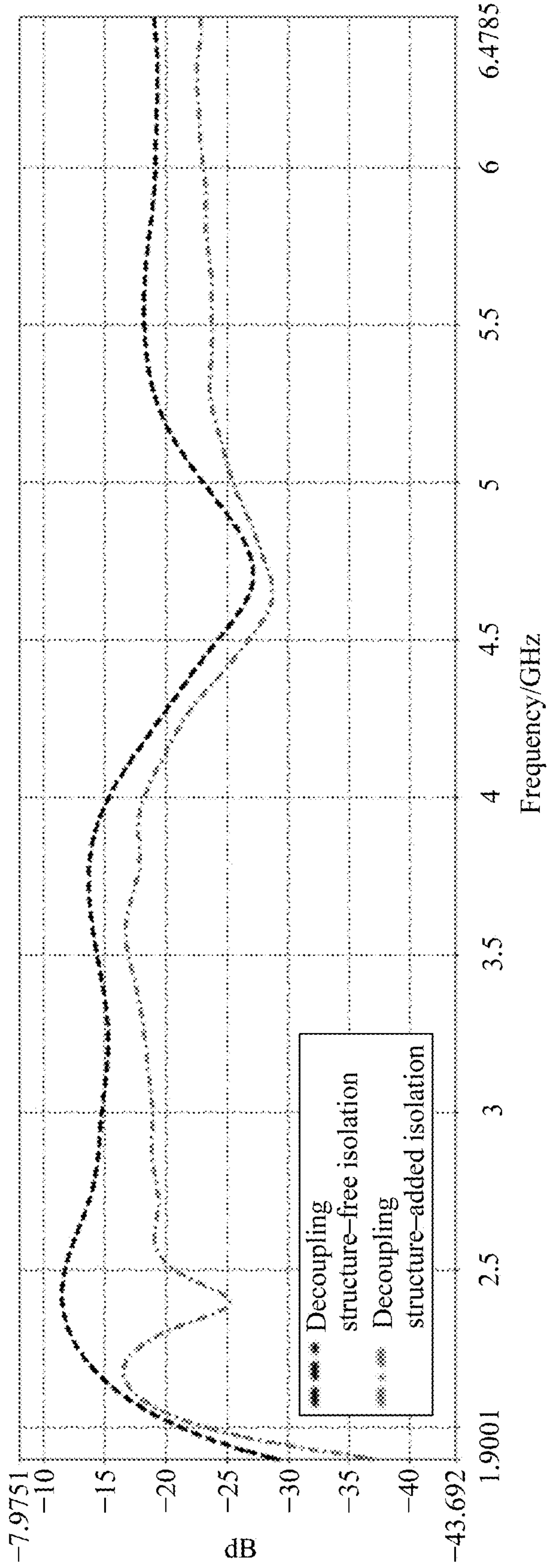
FIG. 5*o* is a diagram of comparison between isolation curves of the MIMO antenna in FIG. 5*d* and the MIMO antenna in FIG. 5*c;*

Still referring to FIG. 5*d*, FIG. 5*e*, FIG. 5*f*, FIG. 5*g*, FIG. 5*h*, FIG. 5*i*, FIG. 5*j*, FIG. 5*k*, FIG. 5*l*, FIG. 5*m*, FIG. 5*n*, and FIG. 5*o*, FIG. 5*d*, FIG. 5*e*, and FIG. 5*f* are schematic diagrams of current distribution of an antenna decoupling structure 3—free MIMO antenna when a first feed point is excited under excitation conditions of frequency bands: 2.5 GHz, 3.8 GHz, and 5.5 GHz, respectively; FIG. 5*g*, FIG. 5*h*, and FIG. 5*i* are schematic diagrams of current distribution of the MIMO antenna in FIG. 5*c* when a first feed point is excited under excitation conditions of frequency bands: 2.5 GHz, 3.8 GHz, and 5.5 GHz, respectively; FIG. 5*j*, FIG. 5*k*, and FIG. 5*l* are schematic diagrams of current modes of the antenna decoupling structure 3 in FIG. 5*c* corresponding to frequency bands: 2.5 GHz, 3.8 GHz, and 5.5 GHz, respectively; FIG. 5*m* is a diagram of a performance curve of an antenna decoupling structure-free MIMO antenna (as shown in FIG. 5*d*); FIG. 5*n* is a diagram of a performance curve of a MIMO antenna (as shown in FIG. 5*g*) having an antenna decoupling structure; and FIG. 5*m* is a diagram of comparison, in a simulation experiment, between isolation curves of the antenna decoupling structure-free MIMO antenna (as shown in FIG. 5*d*) and the MIMO antenna (as shown in FIG. 5*g*) having the antenna decoupling structure 3 in FIG. 5*a*. In the schematic diagrams of current distribution, a lighter color of a portion of the second antenna unit indicates a greater amount of a current coupled to this portion of the second antenna unit. In FIG. 5*m* and FIG. 5*n*, S1,1 denotes a curve of a return loss of the first antenna unit; S2,1 denotes a curve of a return loss of the second antenna unit; and S2,2 denotes isolation curves of the first antenna unit and the second antenna unit.

It can be learned, from FIG. 5*d*, FIG. 5*e*, and FIG. 5*f*, that for the antenna decoupling structure-free MIMO antenna, a heavy current is coupled to the second antenna unit when the first feed point is exited under excitation conditions of different frequency bands, so that an isolation difference is generated between the first antenna unit and the second antenna unit. With reference to FIG. 5*g* and FIG. 5*j*, a current is mainly coupled to the LC resonant structure of the antenna decoupling structure 3 through the antenna floor 4 when the first feed point is excited at the 2.5 GHz frequency band, thereby reducing an amount of the current flowing to the second antenna unit. With reference to FIG. 5*h* and FIG. 5*k*, a current is mainly coupled to the first decoupling stub 33 of the antenna decoupling structure 3 through the antenna floor 4 when the first feed point is excited at the 3.8 GHz frequency band, thereby reducing an amount of the current flowing to the second antenna unit. With reference to FIG. 5*i* and FIG. 5*l*, a current is mainly coupled to the second decoupling stub 34 of the antenna decoupling structure 3 through the antenna floor 4 when the first feed point is excited at the 5.5 GHz frequency band, thereby reducing an amount of the current flowing to the second antenna unit. In summary, according to the antenna decoupling structure provided in this embodiment of this application, decoupling for three frequency bands are implemented by using the LC resonant structure, the first decoupling stub 33, and the second decoupling stub 34, respectively, thereby implementing decoupling for a plurality of operating frequency bands. It can be learned, from FIG. 5*m* and FIG. 5*n*, that the antenna in FIG. 5*c* has a plurality of operating frequency bands that can cover the operating frequency bands of the 5G NR antenna: 2.49 GHz to 2.69 GHz, 3.3 GHz to 3.8 GHz, and 4.4 GHz to 5 GHz. It can be learned, from FIG. 5*o*, that after the antenna decoupling structure is used, isolations of the antenna at the frequency bands of 2.5 GHz, 3.8 GHz, and 5.5 GHz are greatly increased, thereby completely meeting an isolation requirement.

In summary, according to the antenna provided in this embodiment of this application, the total horizontal length of the antenna can be reduced, so that antenna miniaturization is realized, and decoupling can be implemented at more frequency bands.

Figure 5P:
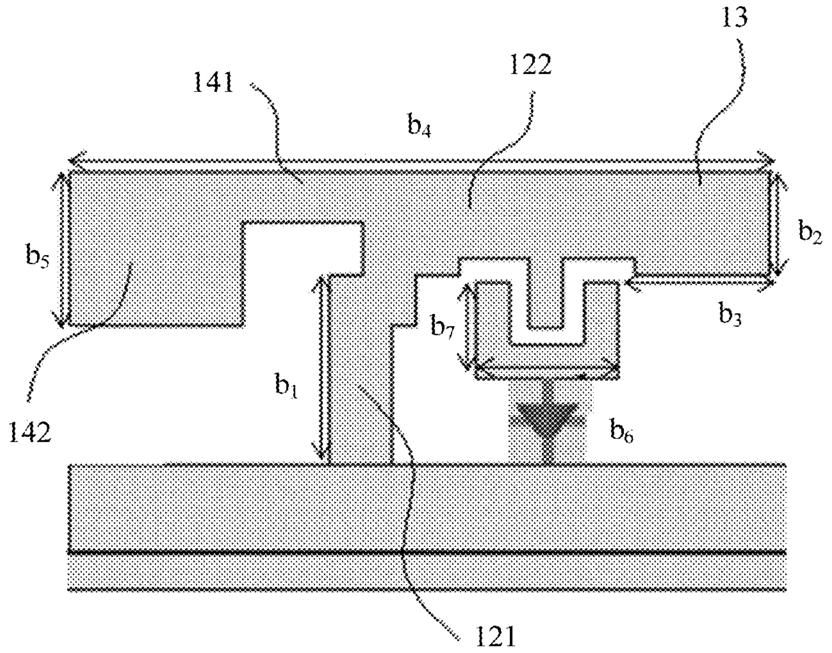
FIG. 5*p* is a diagram of dimensions of a first antenna unit in FIG. 5*c;*
Figure 5Q:
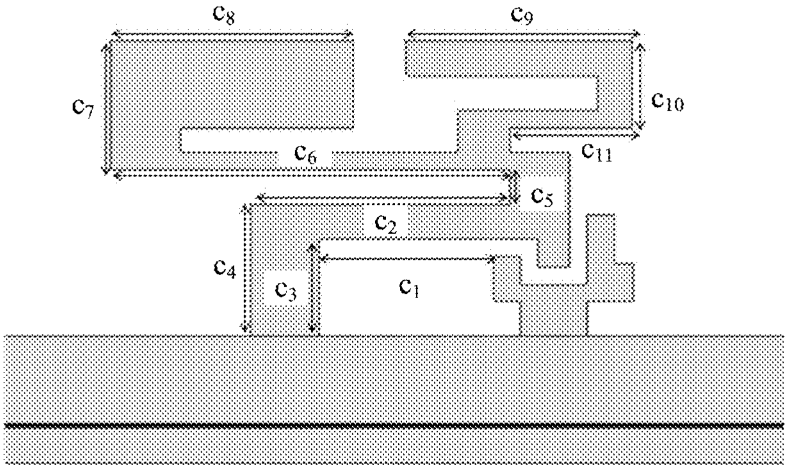
FIG. 5*q* is a diagram of dimensions of an antenna decoupling structure in FIG. 5*c*.

Referring to FIG. FIG. 5*p* and FIG. 5*q*, FIG. 5*p* shows dimensions of the foregoing first antenna unit when the first antenna unit is applied to the NR antenna; and FIG. 5*q* shows dimensions of an antenna decoupling structure configured to decouple the NR antenna.

As shown in FIG. 5*p*, the first floor sub-stub 121 extends from the first end of the first floor sub-stub 121 in a direction away from the antenna floor 4 by $b_1$ ($b_1$=5.5 mm) and in a direction parallel to the antenna floor 4 by a first preset distance, sequentially, and is connected to the first end of the second floor sub-stub 122; a distance $b_2$ between a first side edge and a second side edge of the first radiation stub 13 is 3 mm, a shortest distance $b_3$ between a second end of the first radiation stub 13 and the third groove 111 is 3.9 mm, a distance $b_4$ between a second end of the first radiation stub 13 and the second end of the horizontal radiation stub 141 is 20.2 mm, and a distance $b_5$ between a first side edge and a second side edge of the vertical radiation stub 142 is 4.5 mm; and a width $b_6$ of the third groove 111 is 4.1 mm, and a height $b_7$ of the third groove 111 is 2.8 mm. The total length of the floor stub 12 and a coupling capacitor composed of a third floor sub-stub 123 and the third groove 111 form a left-handed antenna mode whose resonant frequency meets a frequency requirement for a first operating frequency band: 2.5 GHz. Both the first radiation stub 13 and the second radiation stub 14 may be stubs having uniform widths, or may be stubs whose open ends are both wide, as shown in FIG. 5*p*. This is not limited in this application.

As shown in FIG. 5*q*, the grounding stub 32 includes a first grounding sub-stub 321, a second grounding sub-stub 322, and a third grounding sub-stub 324, a first end of the first grounding sub-stub 321 is perpendicularly connected to the antenna floor 4, a second end of the first grounding sub-stub 321 is perpendicularly connected to a first end of the second grounding sub-stub 322, a second end of the second grounding sub-stub 322 is perpendicularly connected to a first end of the third grounding sub-stub 324, and a second end of the third grounding sub-stub 324 faces the antenna floor 4; and the capacitive coupling stub 31B includes a third capacitive coupling sub-stub 31B3 and a fourth capacitive coupling sub-stub 31B4, a first end of the third capacitive coupling sub-stub 31B3 is perpendicularly connected to the antenna floor 4, a second end of the third capacitive coupling sub-stub 31B3 is perpendicularly connected to the fourth capacitive coupling sub-stub 31B4, a second groove 31B5 is formed in a side, away from the antenna floor 4, of the fourth capacitive coupling sub-stub 31B4, and the second end of the third grounding sub-stub 324 is disposed in the second groove 31B5 and opposite to the second groove 31B5 at an interval, to form a coupling capacitor.

A shortest horizontal distance $c_1$ between a first side edge of the first grounding sub-stub 321 and the fourth capacitive coupling sub-stub 31B4 is 7.3 mm, and a shortest horizontal distance $c_2$ between a second side edge of the first grounding sub-stub 321 and the fourth capacitive coupling sub-stub 31B4 is 8.5 mm. The first side edge of the first grounding sub-stub 321 is a side edge perpendicular to the antenna floor 4 and close to the fourth capacitive coupling sub-stub 31B4. The second side edge of the first grounding sub-stub 321 is a side edge perpendicular to the antenna floor 4 and away from the fourth capacitive coupling sub-stub 31B4. A distance $c_3$ between the antenna floor 4 and a first side edge of the second grounding sub-stub 322 is 2.8 mm. A distance $c_4$ between the antenna floor 4 and a second side edge of the second grounding sub-stub 322 is 3.8 mm. The first side edge of the second grounding sub-stub 322 is a side edge parallel to and close to the antenna floor 4. The second side edge of the second grounding sub-stub 322 is a side edge parallel to and away from the antenna floor 4.

For example, the length of the first decoupling stub 33 may be a quarter of a wavelength corresponding to a center frequency of the second target decoupling frequency band; and the length of the second decoupling stub 34 may be a quarter of a wavelength corresponding to a center frequency of the third target decoupling frequency band. However, the first decoupling stub 33 and the second decoupling stub 34 may be bent for a plurality of times, to reduce horizontal space occupied by the first decoupling stub 33 and the second decoupling stub 34.

In an implementation, as shown in FIG. 5*q*, the first end of the first decoupling stub 33 and the second end of the second grounding sub-stub 322 are connected to each other and form a first connection point, and the first decoupling stub 33 extends from the first connection point in a direction away from the antenna floor 4 by $c_5$ ($c_5$=1 mm), in a direction parallel to the antenna floor 4 and away from the third capacitive coupling sub-stub 31B3 by $c_6$ ($c_6$=11.5 mm), in a direction away from the antenna floor 4 by $c_7$ ($c_7$=3.7 mm), and in a direction parallel to the antenna floor 4 and close to the third capacitive coupling sub-stub 31B3 by $c_8$ ($c_8$=7 mm), sequentially; and an open end of the second decoupling stub 34 is disposed opposite to an open end of the first decoupling stub 33, and the second decoupling stub 34 extends from the open end in a direction away from the first decoupling stub 33 by $c_9$ ($c_9$=5 mm), in a direction close to the antenna floor 4 by $c_{10}$ ($c_{10}$=2.5 mm), in a direction close to the first decoupling stub 33 by $c_{11}$ ($c_{11}$=3.5 mm), and in a direction close to and perpendicular to the antenna floor 4, sequentially, and is then connected to the first connection point.

The antenna decoupling structure and the MIMO antenna provided in the embodiments of this application may be applied to a terminal. The terminal may be any device having a wireless communication function, such as a personal computer, a tablet computer, or a mobile phone. This is not limited in this application. For example, the MIMO antenna in FIG. 4*a* may be applied to a WIFI ti-band antenna of a terminal notebook computer. For another example, the MIMO antenna in FIG. 5*c* may be applied to an NR antenna of a terminal notebook computer.

Figure 6:
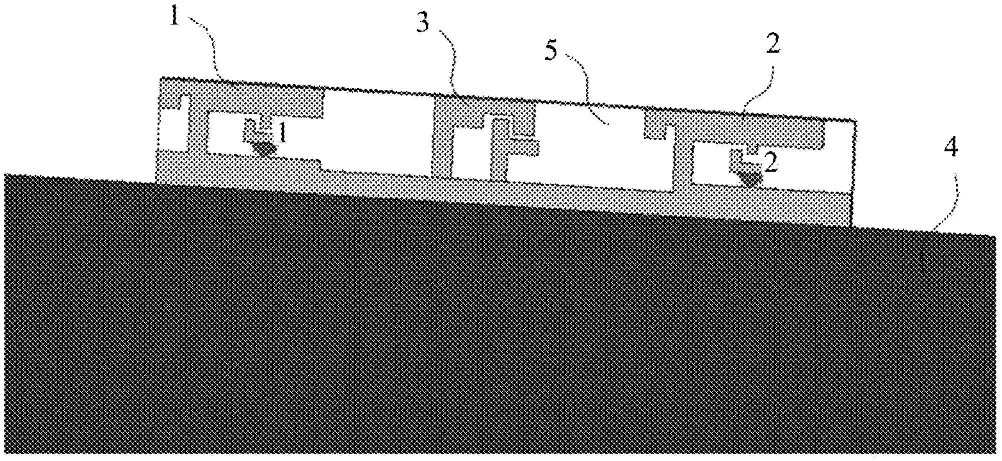
FIG. 6 is a schematic structural diagram of still yet another MIMO antenna according to an embodiment of this application.

An implementation process of the antenna decoupling structure and the antenna is not limited in the embodiments of this application. For example, the process may be printing using a printed circuit board (printed circuit board, PCB) or a flexible printed circuit (flexible printed circuit, FPC) or forming through laser-direct-structuring (laser-direct-structuring, LDS). FIG. 6 is a schematic diagram of a prepared MIMO antenna according to an embodiment of this application. The MIMO antenna in FIG. 6 includes a first antenna unit 1, a second antenna unit 2, and an antenna decoupling structure 3 that are all attached to a dielectric substrate 5. An extended side of the dielectric substrate 5 is perpendicular to the antenna floor 4.

The objectives, technical solutions, and beneficial effects of the present invention are further described in detail in the foregoing specific implementations. It should be understood that the foregoing descriptions are merely specific implementations of the present invention, but are not intended to limit the protection scope of the present invention. Any modification, equivalent replacement, or improvement made on the basis of the technical solutions of the present invention shall fall within the protection scope of the present invention.

What is claimed is:

1. An antenna decoupling structure, comprising a grounding stub a capacitor structure, a first decoupling stub and a second decoupling stub, wherein a first end of the grounding stub is connected to an antenna floor, to form an equivalent inductor;

a first end of the capacitor structure is connected to the antenna floor, and a second end of the capacitor structure is connected to a second end of the grounding stub, so that the equivalent inductor and the capacitor structure form an LC resonant structure, wherein a parameter corresponding to the LC resonant structure meets a decoupling requirement for a first target decoupling frequency band;

the first decoupling stub and the second decoupling stub are respectively disposed on two sides of the grounding stub;

a first end of the first decoupling stub is connected to the second end of the grounding stub, and a length of the first decoupling stub meets a decoupling requirement for a second target decoupling frequency band; and a first end of the second decoupling stub is connected to the second end of the grounding stub, and a length of the second decoupling stub meets a decoupling requirement for a third target decoupling frequency band.

2. The antenna decoupling structure according to claim 1, wherein the length of the first decoupling stub is a quarter of a wavelength corresponding to a center frequency of the second target decoupling frequency band;

the length of the second decoupling stub is a quarter of a wavelength corresponding to a center frequency of the third target decoupling frequency band; and an open end formed after bending of the first decoupling stub is disposed opposite to an open end formed after bending of the second decoupling stub.

3. The antenna decoupling structure according to claim 1, wherein the capacitor structure uses a lumped parameter capacitor.

4. The antenna decoupling structure according to claim 1, wherein the capacitor structure is formed by coupling a capacitive coupling stub to the grounding stub that is disposed opposite to a first end of the capacitive coupling stub at an interval, and a second end of the capacitive coupling stub is connected to the antenna floor.

5. The antenna decoupling structure according to claim 4, wherein the grounding stub comprises a first grounding sub-stub and a second grounding sub-stub that are disposed in an L-shaped form, a first end of the first grounding sub-stub is perpendicularly connected to the antenna floor, a second end of the first grounding sub-stub is perpendicularly connected to a first end of the second grounding sub-stub, and a first groove is formed in a side, facing the antenna floor, of the second grounding sub-stub; and the capacitive coupling stub comprises a first capacitive coupling sub-stub and a second capacitive coupling sub-stub that are disposed in a T-shaped form, a first end of the first capacitive coupling sub-stub is disposed in the first groove and opposite to the first groove at an interval, a second end of the first capacitive coupling sub-stub is perpendicularly connected to the antenna floor, a first end of the second capacitive coupling sub-stub is perpendicularly connected to the first capacitive coupling sub-stub, and the second capacitive coupling sub-stub is disposed opposite to a second end of the second grounding sub-stub at an interval.

6. The antenna decoupling structure according to claim 4, wherein the grounding stub comprises a first grounding sub-stub, a second grounding sub-stub, and a third grounding sub-stub, a first end of the first grounding sub-stub is perpendicularly connected to the antenna floor, a second end of the first grounding sub-stub is perpendicularly connected to a first end of the second grounding sub-stub, a second end of the second grounding sub-stub is perpendicularly connected to a first end of the third grounding sub-stub, and a second end of the third grounding sub-stub faces the antenna floor; and the capacitive coupling stub comprises a third capacitive coupling sub-stub and a fourth capacitive coupling sub-stub, a first end of the third capacitive coupling sub-stub is perpendicularly connected to the antenna floor, a second end of the third capacitive coupling sub-stub is perpendicularly connected to the fourth capacitive coupling sub-stub, a second groove is formed in a side, away from the antenna floor, of the fourth capacitive coupling sub-stub, and the second end of the third grounding sub-stub is disposed in the second groove and opposite to the second groove at an interval.

7. The antenna decoupling structure according to claim 4, wherein a plurality of coupling slots are formed between the first end of the capacitive coupling stub and the first end of the grounding stub.

8. The antenna decoupling structure according to claim 1, wherein the first target decoupling frequency band ranges from 2.49 GHz to 2.69 GHz, the second target decoupling frequency band ranges from 3.3 GHz to 3.8 GHz, and the third target decoupling frequency band ranges from 4.4 GHz to 5 GHz; the grounding stub comprises a first grounding sub-stub, a second grounding sub-stub, and a third grounding sub-stub, a first end of the first grounding sub-stub is perpendicularly connected to the antenna floor, a second end of the first grounding sub-stub is perpendicularly connected to a first end of the second grounding sub-stub, a second end of the second grounding sub-stub is perpendicularly connected to a first end of the third grounding sub-stub, and a second end of the third grounding sub-stub faces the antenna floor; the capacitive coupling stub comprises a third capacitive coupling sub-stub and a fourth capacitive coupling sub-stub, a first end of the third capacitive coupling sub-stub is perpendicularly connected to the antenna floor, a second end of the third capacitive coupling sub-stub is perpendicularly connected to the fourth capacitive coupling sub-stub, a second groove is formed in a side, away from the antenna floor, of the fourth capacitive coupling sub-stub, and the second end of the third grounding sub-stub is disposed in the second groove and opposite to the second groove at an interval;

a shortest horizontal distance between a first side edge of the first grounding sub-stub and the fourth capacitive coupling sub-stub is 7.3 mm, a shortest horizontal distance between a second side edge of the first grounding sub-stub and the fourth capacitive coupling sub-stub is 8.5 mm, a distance between the antenna floor and a first side edge of the second grounding sub-stub is 2.8 mm, and a distance between the antenna floor and a second side edge of the second grounding sub-stub is 3.8 mm;

the first end of the first decoupling stub and the second end of the second grounding sub-stub are connected to each other and form a first connection point, and the first decoupling stub extends from the first connection point in a direction away from the antenna floor by 1 mm, in a direction parallel to the antenna floor and away from the third capacitive coupling sub-stub by 11.5 mm, in a direction away from the antenna floor by 3.7 mm, and in a direction parallel to the antenna floor and close to the third capacitive coupling sub-stub by 7 mm, sequentially; and an open end of the second decoupling stub is disposed opposite to an open end of the first decoupling stub, and the second decoupling stub extends from the open end in a direction away from the first decoupling stub by 5 mm, in a direction close to the antenna floor by 2.5 mm, in a direction close to the first decoupling stub by 3.5 mm, and in a direction close to and perpendicular to the antenna floor, sequentially, and is then connected to the first connection point.

9. A multiple input multiple output (MIMO) antenna, comprising:

a first antenna unit, a second antenna unit, and an antenna decoupling structure disposed at a preset location between the first antenna unit and the second antenna unit, and configured to increase an isolation between the first antenna unit and the second antenna unit, wherein the antenna decoupling structure comprises:

a grounding stub, a capacitor structure, a first decoupling stub, and a second decoupling stub, wherein a first end of the grounding stub is connected to an antenna floor, to form an equivalent inductor; and a first end of the capacitor structure is connected to the antenna floor, and a second end of the capacitor structure is connected to a second end of the grounding stub, so that the equivalent inductor and the capacitor structure form an LC resonant structure, wherein a parameter corresponding to the LC resonant structure meets a decoupling requirement for a first target decoupling frequency band;

the first decoupling stub and the second decoupling stub are respectively disposed on two sides of the grounding stub;

a first end of the first decoupling stub is connected to the second end of the grounding stub, and a length of the first decoupling stub meets a decoupling requirement for a second target decoupling frequency band; and a first end of the second decoupling stub is connected to the second end of the grounding stub, and a length of the second decoupling stub meets a decoupling requirement for a third target decoupling frequency band.

10. The MIMO antenna according to claim 9, wherein the first antenna unit comprises a feed stub, a floor stub, and a first radiation stub, wherein the floor stub comprises a first floor sub-stub and a second floor sub-stub;

a first end of the first floor sub-stub is connected to the antenna floor;

a second end of the first floor sub-stub is connected to a first end of the second floor sub-stub;

a second end of the second floor sub-stub is disposed opposite to the feed stub at an interval, to form a coupling capacitor;

the floor stub and the feed stub form a left-handed antenna mode, and a parameter corresponding to the left-handed antenna mode meets a frequency requirement for the first antenna unit at a first operating frequency band;

the second end of the second floor sub-stub is connected to the first radiation stub, the first radiation stub and the feed stub form a first monopole antenna mode, and a parameter corresponding to the first monopole antenna mode meets a frequency requirement for the first antenna unit at a second operating frequency band; and the first operating frequency band is less than the second operating frequency band.

11. The MIMO antenna according to claim 10, further comprising a second radiation stub, wherein the second radiation stub and the first radiation stub are respectively disposed on two sides of the floor stub, a first end of the second radiation stub is connected to the first end of the second floor sub-stub, the first radiation stub, the second floor sub-stub, the second radiation stub, and the feed stub form a balanced antenna mode, and a parameter corresponding to the balanced antenna mode meets a frequency requirement for the first antenna unit at a third operating frequency band;

the second radiation stub, the second floor sub-stub, and the feed stub form a second monopole antenna mode, and a parameter corresponding to the second monopole antenna mode meets a frequency requirement for the first antenna unit at a fourth operating frequency band; and the first operating frequency band is less than the fourth operating frequency band, the fourth operating frequency band is less than the third operating frequency band, and the third operating frequency band is less than the second operating frequency band.

12. The MIMO antenna according to claim 11, wherein the floor stub further comprises a third floor sub-stub, a first end of the third floor sub-stub is perpendicularly connected to the second end of the second floor sub-stub, a third groove is formed in a side, away from the antenna floor, of the feed stub, and a second end of the third floor sub-stub is disposed in the third groove and opposite to the third groove at an interval; and the second radiation stub comprises a horizontal radiation stub and a vertical radiation stub, a first end of the horizontal radiation stub is connected to the first end of the second floor sub-stub, a second end of the horizontal radiation stub is connected to a first end of the vertical radiation stub, and a second end of the vertical radiation stub faces the antenna floor.

13. The MIMO antenna according to claim 12, wherein the MIMO antenna is used as a WIFI MIMO tri-band antenna, wherein operating frequency bands of the WIFI MIMO tri-band antenna are 2.4 GHz to 2.5 GHz, 5.1 GHz to 5.8 GHz, and 5.9 GHz to 7.1 GHz, respectively;

a shortest horizontal distance between the first floor sub-stub and the third floor sub-stub is 6 mm, a distance between a first side edge of the second floor sub-stub and the antenna floor is 4.5 mm, a distance between a second side edge of the second floor sub-stub and the antenna floor is 7.5 mm, a distance between a first side edge of the first radiation stub and a second side edge of the first radiation stub is 3 mm, a distance between a second end of the first radiation stub and a first side edge of the first floor sub-stub is 11.2 mm, a distance between the second end of the first radiation stub and the second end of the horizontal radiation stub is 16 mm, a distance between a first side edge of the vertical radiation stub and a first side edge of the horizontal radiation stub is 2 mm, a distance between the first side edge of the vertical radiation stub and a second side edge of the horizontal radiation stub is 3 mm, and a distance between the first side edge of the horizontal radiation stub and the antenna floor is 6 mm; and the third groove is 4.14 mm wide and 2.3 mm high, and an opening of the third groove is 2.14 mm wide.

14. The MIMO antenna according to claim 12, wherein the MIMO antenna is used as an NR antenna, wherein operating frequency bands of the NR antenna are 2.49 GHz to 2.69 GHz, 3.3 GHz to 3.8 GHz, and 4.4 GHz to 5 GHz, respectively;

the first floor sub-stub extends from the first end of the first floor sub-stub in a direction away from the antenna floor by 5.5 mm and in a direction parallel to the antenna floor by a first preset distance, sequentially, and is connected to the first end of the second floor sub-stub;

a distance between a first side edge and a second side edge of the first radiation stub is 3 mm, a shortest distance between a second end of the first radiation stub and the third groove is 3.9 mm, a distance between a second end of the first radiation stub and the second end of the horizontal radiation stub is 20.2 mm, and a distance between a first side edge and a second side edge of the vertical radiation stub is 4.5 mm; and the third groove is 4.1 mm wide and 2.8 mm high.

15. The MIMO antenna according to claim 9, wherein a structure of the first antenna unit is the same as that of the second antenna unit.

16. A terminal, comprising:

a multiple input and multiple output (MIMO) antenna, the MIMO antenna comprising:

a first antenna unit, a second antenna unit, and an antenna decoupling structure disposed at a preset location between the first antenna unit and the second antenna unit, and configured to increase an isolation between the first antenna unit and the second antenna unit, wherein the antenna decoupling structure comprises:

a grounding stub, a capacitor structure, a first decoupling stub, and a second decoupling stub, wherein a first end of the grounding stub is connected to an antenna floor, to form an equivalent inductor; and a first end of the capacitor structure is connected to the antenna floor, and a second end of the capacitor structure is connected to a second end of the grounding stub, so that the equivalent inductor and the capacitor structure form an LC resonant structure, wherein a parameter corresponding to the LC resonant structure meets a decoupling requirement for a first target decoupling frequency band;

the first decoupling stub and the second decoupling stub are respectively disposed on two sides of the grounding stub;

a first end of the first decoupling stub is connected to the second end of the grounding stub, and a length of the first decoupling stub meets a decoupling requirement for a second target decoupling frequency band; and a first end of the second decoupling stub is connected to the second end of the grounding stub, and a length of the second decoupling stub meets a decoupling requirement for a third target decoupling frequency band.

17. The terminal of claim 16, wherein the length of the first decoupling stub is a quarter of a wavelength corresponding to a center frequency of the second target decoupling frequency band;

the length of the second decoupling stub is a quarter of a wavelength corresponding to a center frequency of the third target decoupling frequency band; and an open end formed after bending of the first decoupling stub is disposed opposite to an open end formed after bending of the second decoupling stub.

18. The terminal according to claim 16, wherein the capacitor structure uses a lumped parameter capacitor.

19. The terminal according to claim 16, wherein the capacitor structure is formed by coupling a capacitive coupling stub to the grounding stub that is disposed opposite to a first end of the capacitive coupling stub at an interval, and a second end of the capacitive coupling stub is connected to the antenna floor.

* * * * *